(12) United States Patent
Jia et al.

(10) Patent No.: US 10,564,395 B2
(45) Date of Patent: Feb. 18, 2020

(54) SEVEN-PIECE WIDE-ANGLE CAMERA LENS

(71) Applicant: Zhejiang Sunny Optics Co., Ltd., Ningbo (CN)

(72) Inventors: Yuanlin Jia, Ningbo (CN); Fujian Dai, Ningbo (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 114 days.

(21) Appl. No.: 15/578,703

(22) PCT Filed: Feb. 22, 2017

(86) PCT No.: PCT/CN2017/074324
§ 371 (c)(1),
(2) Date: Nov. 30, 2017

(87) PCT Pub. No.: WO2018/010433
PCT Pub. Date: Jan. 18, 2018

(65) Prior Publication Data
US 2019/0187442 A1  Jun. 20, 2019

(30) Foreign Application Priority Data
Jul. 13, 2016  (CN) .......................... 2016 1 0552759

(51) Int. Cl.
*G02B 9/64* (2006.01)
*G02B 13/04* (2006.01)
(Continued)

(52) U.S. Cl.
CPC ........... *G02B 9/64* (2013.01); *G02B 13/0045* (2013.01); *G02B 13/04* (2013.01); *G02B 13/06* (2013.01); *G02B 27/0025* (2013.01)

(58) Field of Classification Search
CPC ...... G02B 9/64; G02B 13/06; G02B 13/0045; G02B 13/04; G02B 27/0025
(Continued)

(56) References Cited

U.S. PATENT DOCUMENTS 4,046,459 A    9/1977  Kawamura
4,867,546 A    9/1989  Nishioka et al.
(Continued)

FOREIGN PATENT DOCUMENTS

CN    102388331 A    3/2012
CN    103777332 A    5/2014
(Continued)

*Primary Examiner* — Jordan M Schwartz
(74) *Attorney, Agent, or Firm* — Sughrue Mion, PLLC

(57) ABSTRACT

A seven-lens wide-angle camera lens, having: a first lens with a negative refractive power; a second lens with a negative refractive power; a third lens with a refractive power; a fourth lens with a positive refractive power; a fifth lens with a refractive power; a sixth lens with a refractive power; and a seventh lens with a refractive power; and satisfies the following relational expressions: $0.06 < CT3\Sigma TTL < 0.15$; and $-0.7 < f6/f7 < -0.2$; wherein, CT3 is a center thickness of the third lens that is on an optical axis; TTL is an axial distance from an object side surface to an imaging plane of the first lens; f6 is an effective focal length of the sixth lens; and f7 is an effective focal length of the seventh lens. By reasonably combining the 7 lenses, can obtain large field angles, which realizes miniaturization and favorable manufacturability while ensuring high resolution and imaging quality.

7 Claims, 34 Drawing Sheets

(51) Int. Cl.
*G02B 13/06* (2006.01)
*G02B 13/00* (2006.01)
*G02B 27/00* (2006.01)

(58) Field of Classification Search
USPC .................. 359/751, 755, 708, 749–750, 754
See application file for complete search history.

(56) References Cited

U.S. PATENT DOCUMENTS

| | | | |
|---|---|---|---|
| 5,546,232 A | 8/1996 | Hirakawa | |
| 5,661,606 A | 8/1997 | Sato | |
| 5,999,337 A | 12/1999 | Ozaki | |
| 2011/0317285 A1* | 12/2011 | Ohashi | G02B 9/64 359/753 |
| 2012/0133802 A1 | 5/2012 | Katakura et al. | |
| 2012/0212836 A1* | 8/2012 | Hsieh | G02B 13/0045 359/708 |
| 2017/0242220 A1* | 8/2017 | Lee | G02B 13/06 |
| 2017/0254988 A1* | 9/2017 | Lai | G02B 5/005 |
| 2018/0157007 A1* | 6/2018 | Kim | G02B 13/0045 |
| 2018/0203211 A1* | 7/2018 | Kim | G02B 13/06 |

FOREIGN PATENT DOCUMENTS

| | | |
|---|---|---|
| CN | 104793316 A | 7/2015 |
| CN | 105445914 A | 3/2016 |
| JP | 61-162021 A | 7/1986 |
| JP | 6-300969 A | 10/1994 |
| JP | 7-181377 A | 7/1995 |
| JP | 11-125767 A | 5/1999 |
| JP | 2008-134494 A | 6/2008 |
| JP | 2008-310133 A | 12/2008 |
| JP | 2014-102291 A | 6/2014 |
| JP | 2014-102358 A | 6/2014 |
| WO | 2011/148822 A1 | 12/2011 |
| WO | 2013/051366 A1 | 4/2013 |
| WO | 2016/003732 A1 | 1/2016 |
| WO | 2017/213110 A1 | 12/2017 |

* cited by examiner

SEVEN-PIECE WIDE-ANGLE CAMERA LENS

CROSS REFERENCE TO RELATED APPLICATIONS

This application is the national phase entry of International Application PCT/CN2017/074324, filed on Feb. 22, 2017, which is based upon and claims priority to Chinese Patent Application No. 201610552759.X, filed on Jul. 13, 2016.

TECHNICAL FIELD

The present invention relates to a wide-angle camera lens, and particularly to a wide-angle camera lens that is formed by seven optical lenses.

BACKGROUND ART

Along with the development of technology, wide-angle camera lenses, including ultra wide angle lenses, fish-eye lenses and other camera lenses whose visual angles are greater than standard lenses, are becoming important in increasingly more occasions, such as photography, security protection, measuring, projecting, recreation and vehicle-mounted devices. In the field of photography, because the characteristics of short focal lengths and large fields of view of wide-angle camera lenses, the acquired unique barrel distortions will bring the observers strong visual impact. As another example, in the field of measuring, because wide-angle camera lenses have the characteristic of large fields of view, and imaging for once can obtain more amount of information, the data that can be obtained by measuring are increased. As another example, in the field of projecting, commonly used projector lenses are to image in a plane, but fish-eye lenses of large fields of view can image in a round sky screen, which in the watching brings the observer an immersed watching feeling of watching the starry sky in a summer night. As another example, in the field of vehicle-mounted applications, with the ultra-large field angles, the side area that can be observed is broader, which will effectively facilitates the applications of car reversing and all round looking. The photosensitive elements of general optical systems are merely Charge Coupled Device (CCD) or Complementary Metal-Oxide-Semiconductor Transistors (CMOS). Along with the progress of the semiconductor manufacturing process technique, the pixel sizes of photosensitive elements are decreasing, and optical systems tend to have more pixels and higher imaging quality. Additionally, in consideration of the popularization of the products, camera lenses are required to have increasingly smaller sizes, and increasingly lower cost is required.

Presently, general wide-angle camera lenses mostly employ all-glass constructions. For example, as shown by the patent with the patent number of "WO201603732A1", a camera lens consists of seven glass optical lenses, to provide a photographic object lens with a large relative aperture and a small volume. However, the ceaseless development of portable electronic products proposes higher requirements on the miniaturization, the light weight trend, the wide angle trend and the imaging quality of camera lenses. In order to satisfy the requirements on miniaturization and light weight trend, it is required to further shorten the overall lengths of the camera lenses and employ plastic optical lenses. However, the conventional all-glass structures cannot further shorten the overall system length and enlarge field angles while ensuring the imaging quality. The emerging of precision finishing enables the industrialized production of the processing of aspheric surfaces. Precision finishing technique does not only comprise the direct grinding aspheric surface processing of glass materials, but also comprise the die casting aspheric surface processing of glass materials and the jet molding aspheric surface processing of plastic materials. Generally, the employing of aspheric surfaces cannot only remarkably improve the image quality and decrease the aberration, but also reduce the number of the optical lenses of the camera lenses and reduce the volumes. The materials of aspheric optical lenses include glass and plastic, and the aspheric optical lenses of glass materials can be processed by abrasive machining and die casting. The employing of aspheric surfaces tremendously facilitates the performance buildup of wide-angle camera lenses.

SUMMARY OF THE DISCLOSURE

The present invention aims at providing a seven-lens wide-angle camera lens that is miniaturized, has high imaging quality and employs an aspheric surface, to overcome the defects of the prior art. Therefore, the present invention provides a seven-lens wide-angle camera lens. The seven-lens wide-angle camera lens that is provided by the present invention comprises, successively from an object side to an image side: a first optical lens that has a negative refractive power; a second optical lens that has a negative refractive power; a third optical lens that has a refractive power; a fourth optical lens that has a positive refractive power; a fifth optical lens that has a refractive power; a sixth optical lens that has a refractive power; and a seventh optical lens that has a refractive power; and satisfies the following relational expressions: $0.06 < CT3/TTL < 0.15$; and $-0.7 < f6/f7 < -0.2$; wherein, CT3 is a center thickness of the third optical lens that is on an optical axis; TTL is an axial distance from an object side surface of the first optical lens to an imaging plane; f6 is an effective focal length of the sixth optical lens; and f7 is an effective focal length of the seventh optical lens. The above design facilities realizing the miniaturization of the camera lens while ensuring that the camera lens of the present invention has sufficiently large visual angles and high imaging quality.

Preferably, the seven-lens wide-angle camera lens of the present invention satisfies the following relational expression: $1.5 < f4/f < 3$, wherein, f4 is an effective focal length of the fourth optical lens; and f is an effective focal length of the seven-lens wide-angle camera lens.

Wide-angle camera lenses require small focal lengths. A too long positive focal length of the fourth optical lens is adverse to rectifying aberration, and a too short one is adverse to the processing. The satisfying of the above expression facilities ensuring the high image quality and meanwhile maintains the good manufacturability.

More preferably, the seven-lens wide-angle camera lens of the present invention satisfies the following relational expression: $1.3 < ImgH/f < 2.5$, wherein, ImgH is a half of a length of a diagonal line of an effective pixel region on the imaging plane; and f is an effective focal length of the seven-lens wide-angle camera lens. In optical systems that are smaller than 180°, with the same image height, a too long focal length causes large negative distortion, and a too short one has poor manufacturability, and additionally cannot ensure the brightness of the edge image surface. The satisfying of the above expression can effectively rectify the distortion, to ensure the image quality and the producibility.

More preferably, the seven-lens wide-angle camera lens of the present invention satisfies the following relational expression: $0.2<\Sigma T/TTL<0.5$, wherein, $\Sigma T$ is a sum of axial spacing distances of all two adjacent optical lenses of the first optical lens to the seventh optical lens; and TTL is the axial distance from an object side surface of the first optical lens to an imaging plane With the same length dimension, a too long spacing will cause the uneven distribution of the sizes of single optical lenses, and is adverse to miniaturization, and a too short one cannot ensure the independence, is adverse to rectifying the off axis aberration, and increases the risk of generating ghost images. The satisfying of the above expression can simultaneously obtain both of good manufacturability and good image quality.

More preferably, in the seven-lens wide-angle camera lens of the present invention: the fifth optical lens has a negative refractive power.

More preferably, in the seven-lens wide-angle camera lens of the present invention: the sixth optical lens has a positive refractive power, and its image side surface is a convex surface.

More preferably, in the seven-lens wide-angle camera lens of the present invention: the seventh optical lens has a negative refractive power.

More preferably, the seven-lens wide-angle camera lens of the present invention satisfies the following relational expression: $-4.1<f1/f<-2.5$, wherein, f1 is an effective focal length of the first optical lens; and f is an effective focal length of the seven-lens wide-angle camera lens.

In order to realize large visual angles, the system focal length is generally short. For the form wherein the first optical lens has a positive refractive power, the back focal length cannot be easily made very long, and is generally smaller than the system focal length of the camera lens, and the negative refractive power of the first optical lens can ensure adequate back focal length, facilities the assembling, and can compress the chief ray angles of external fields of view. The satisfying of the above expression facilities realizing large field angles and ensures a sufficiently long back focal length, and can effectively control the generating of aberration, which facilities optical lens manufacturing.

More preferably, the seven-lens wide-angle camera lens of the present invention satisfies the following relational expression: $0.55<CT3/CT6<1.3$, wherein, CT3 is the center thickness of the third optical lens that is on an optical axis; and CT6 is a center thickness of the sixth optical lens that is on an optical axis.

A too large thickness of the third optical lens is adverse to rectifying monochromatic aberration, and a too small one is adverse to the assembling. A too large thickness of the sixth optical lens is adverse to rectifying chromatic aberration, and a too small one is adverse to the optical lens manufacturing. The satisfying of the above expression effectively simultaneously obtains both of good manufacturability and good image quality.

More preferably, the seven-lens wide-angle camera lens of the present invention satisfies the following relational expression: $0.25<CT5/CT6<0.5$, wherein, CT5 is a center thickness of the fifth optical lens that is on an optical axis; and CT6 is a center thickness of the sixth optical lens that is on an optical axis. A too large ratio of the above expression is adverse to eliminate chromatic aberration, and a too small one causes too small thickness of the fifth optical lens and unsatisfactory manufacturability. The satisfying of the above expression can effectively balance the chromatic aberration and the manufacturability.

More preferably, the seven-lens wide-angle camera lens of the present invention satisfies the following relational expression: $0.7<DT31/DT62<1.1$, wherein, DT31 is an effective radius of an object side surface of the third optical lens; and DT62 is an effective radius of an image side surface of the sixth optical lens.

A too large aperture of the third optical lens is adverse to rectifying aberration, and a too small one is adverse to the assembling. A too large aperture of the sixth optical lens is adverse to the miniaturization of the camera lens, and a too small one is adverse to rectifying aberration. The satisfying of the above expression can ensure high image quality, and simultaneously obtain both of good manufacturability and good miniaturization.

More preferably, in the seven-lens wide-angle camera lens of the present invention: the fifth optical lens has a positive refractive power, and its image side surface is a convex surface.

More preferably, in the seven-lens wide-angle camera lens of the present invention: the sixth optical lens has a negative refractive power, its object side surface is a concave surface, and its image side surface is a concave surface.

More preferably, in the seven-lens wide-angle camera lens of the present invention: the seventh optical lens has a positive refractive power.

More preferably, the seven-lens wide-angle camera lens of the present invention satisfies the following relational expression: $1<f3/f5<3.5$, wherein, f3 is an effective focal length of the third optical lens, and f5 is an effective focal length of the fifth optical lens.

A too large ratio of the above expression causes the fifth optical lens to bear too heavy refractive power, which results in too poor manufacturability and is adverse to rectifying aberration, and a too small one results in that the aperture of the third optical lens cannot be made large enough, which makes the assemblage manufacturability unsatisfactory. The satisfying of the above expression can effectively ensure the optical lens manufacturability and the assemblage manufacturability.

More preferably, the seven-lens wide-angle camera lens of the present invention satisfies the following relational expression: $0.3<f5/f7<0.6$, wherein, f5 is an effective focal length of the fifth optical lens, and f7 is the effective focal length of the seventh optical lens.

The cooperation of the fifth optical lens and the seventh optical lens with the sixth optical lens can rectify the chromatic aberration of the system. The satisfying of the above expression facilities rectifying chromatic aberration, to ensure the manufacturability of the fifth optical lens.

More preferably, the seven-lens wide-angle camera lens of the present invention satisfies the following relational expression: $0.7<R10/R11<1.2$; wherein, R10 is a curvature of an image side surface of the fifth optical lens; and R11 is a curvature of an object side surface of the sixth optical lens.

The cooperation of the fifth optical lens with the sixth optical lens can rectify the chromatic aberration of the system. A too large deviation between the curvatures of the image side surface of the fifth optical lens and the object side surface of the sixth optical lens is adverse to rectifying chromatic aberration, and a too close one is adverse to rectifying monochromatic aberration. The ratio of the above expression realizes the balance between aberrations.

More preferably, the seven-lens wide-angle camera lens of the present invention satisfies the following relational expression: $0.6<DT62/DT72<1$, wherein, DT62 is an effective radius of an image side surface of the sixth optical lens; and DT72 is an effective radius of an image side surface of the seventh optical lens.

A too large ratio of the above expression is adverse to the miniaturization of the system, and a too small one is adverse to the assembling. The ratio effectively balances the camera lens dimension and the manufacturability.

ADVANTAGEOUS EFFECTS

The advantageous effects of the present invention are that: the present invention, by reasonably distributing the refractive powers of the seven optical lenses, can obtain large field angles; the present invention, by the reasonable design parameters and the matching relations between the design parameters, realizes miniaturization while ensuring high resolution and high imaging quality; and the present invention can realize good manufacturability. The present invention is suitable for the application in plastic aspheric surfaces, which facilities decreasing the cost. The design of combining glass optical lenses and plastic optical lenses can realize favorable environment reliability.

DETAILED DESCRIPTION OF THE DISCLOSURE

The present invention is further described in conjunction with the drawings and the embodiments.

The First Embodiment

Figure 1:
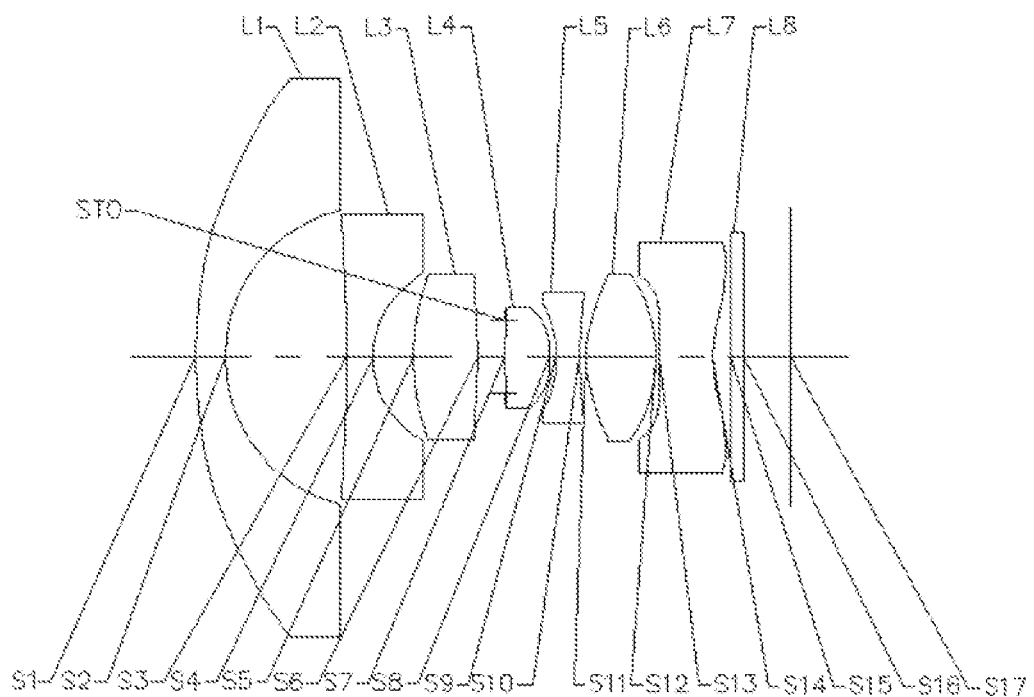
FIG. 1 is the structural schematic diagram of the seven-lens wide-angle camera lens of the first embodiment.

The seven-lens wide-angle camera lens of the present embodiment, as shown by FIG. 1, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a negative refractive power, a sixth optical lens L6 that has a positive refractive power and whose image side surface is a convex surface, a seventh optical lens L7 that has a negative refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
| --- | --- |
| Effective focal length of first optical lens: f1 (mm) | −4.95 |
| Effective focal length of second optical lens: f2 (mm) | −2.66 |
| Effective focal length of third optical lens: f3 (mm) | 3.7 |
| Effective focal length of fourth optical lens: f4 (mm) | 2.11 |
| Effective focal length of fifth optical lens: f5 (mm) | −2.33 |
| Effective focal length of sixth optical lens: f6 (mm) | 2.37 |
| Effective focal length of seventh optical lens: f7 (mm) | −6.34 |
| Effective focal length of seven-piece wide-angle camera lens: f (mm) | 1.28 |
| Stop value: Fno | 2.4 |
| Semiangular field: HFOV (°) | 110 |
| CT3/TTL | 0.11 |
| f6/f7 | −0.37 |
| f4/f | 1.65 |
| ImgH/f | 1.94 |
| ΣT/TTL | 0.34 |
| f1/f | −3.87 |
| CT3/CT6 | 0.92 |
| CT5/CT6 | 0.34 |
| DT31/DT62 | 0.99 | wherein: CT3 is the center thickness of the third optical lens that is on the optical axis; CT5 is the center thickness of the third optical lens that is on the optical axis; CT6 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; DT31 is the effective radius of the object side surface of the third optical lens; and DT62 is the effective radius of the image side surface of the sixth optical lens.

In order to realize the above design parameters, the detailed design that is employed by the seven-lens wide-angle camera lens of the present embodiment can be seen in the following table:

| Surface number | Surface type | Curvature | Thickness | Material | Conic coefficient |
| --- | --- | --- | --- | --- | --- |
| OBJ | Spheric surface | Infinity | Infinity | | |
| S1 | Spheric surface | 7.68 | 0.5 | 1.80/46.6 | |
| S2 | Spheric surface | 2.5539 | 2.0404 | | |
| S3 | Aspheric surface | −24.4534 | 0.44 | 1.54/56.1 | 0 |
| S4 | Aspheric surface | 1.5538 | 0.6763 | | 0 |
| S5 | Spheric surface | 4.1468 | 1.0767 | 1.85/23.8 | |

-continued

| Surface number | Surface type | Curvature | Thickness | Material | Conic coefficient |
|---|---|---|---|---|---|
| S6 | Spheric surface | −11.7655 | 0.4525 | | |
| STO | Spheric surface | Infinity | 0.0078 | | |
| S7 | Aspheric surface | 4.068 | 0.7638 | 1.54/56.1 | 0 |
| S8 | Aspheric surface | −1.5032 | 0.1 | | 0 |
| S9 | Aspheric surface | −1.9016 | 0.4 | 1.64/23.5 | 0 |
| S10 | Aspheric surface | 7.8233 | 0.1 | | 0 |
| S11 | Aspheric surface | 2.0609 | 1.1727 | 1.54/56.1 | 0 |
| S12 | Aspheric surface | −2.7918 | 0.0499 | | 0 |
| S13 | Aspheric surface | 5.4597 | 0.9099 | 1.64/23.5 | 0 |
| S14 | Aspheric surface | 2.1865 | 0.3 | | 0 |
| S15 | Spheric surface | Infinity | 0.21 | 1.52/64.2 | |
| S16 | Spheric surface | Infinity | 0.8 | | |
| S17 | Spheric surface | Infinity | | | |

The aspheric high order aberration coefficients (A4, A6, A8, A10 and A12) of the aspheric lens in the seven-lens wide-angle camera lens of the present embodiment can be seen in the following table:

| Surface number | A4 | A6 | A8 | A10 | A12 |
|---|---|---|---|---|---|
| S3 | 2.77E−03 | −1.09E−03 | 2.01E−04 | −1.07E−05 | 8.44E−18 |
| S4 | 2.56E−03 | 2.91E−04 | −2.56E−03 | −9.17E−04 | −5.29E−14 |
| S7 | −8.48E−02 | −9.35E−02 | 8.95E−03 | −4.28E−01 | −4.77E−23 |
| S8 | −1.02E−01 | −4.35E−02 | 3.82E−02 | −1.43E−01 | 0.00E+00 |
| S9 | 1.41E−02 | 1.70E−02 | −1.06E−01 | 1.13E−01 | 2.28E−23 |
| S10 | 0.00E+00 | 0.00E+00 | 0.00E+00 | 0.00E+00 | 0.00E+00 |
| S11 | −7.29E−02 | 3.32E−02 | −1.28E−02 | 2.06E−03 | 0.00E+00 |
| S12 | −1.26E−02 | 0.00E+00 | 0.00E+00 | 0.00E+00 | 0.00E+00 |
| S13 | −1.17E−01 | −7.90E−03 | 1.31E−03 | −2.09E−03 | 1.48E−21 |
| S14 | −9.82E−02 | 1.28E−02 | −9.58E−04 | −1.53E−04 | 0.00E+00 |

Figure 2:
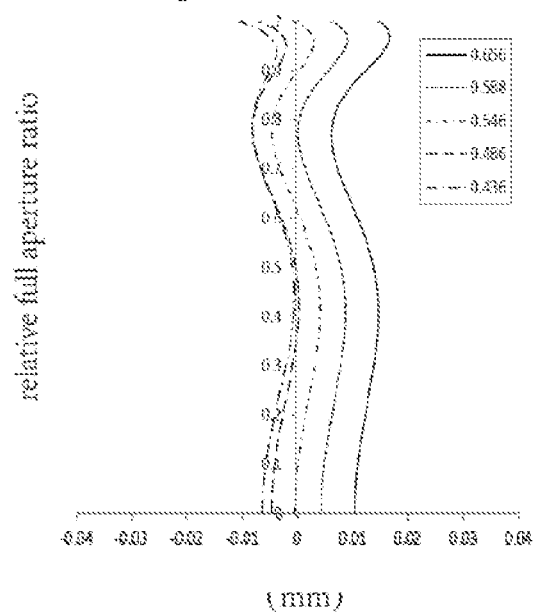
FIG. 2 is the axis chromatic aberration diagram of the seven-lens wide-angle camera lens of the first embodiment.
Figure 3:
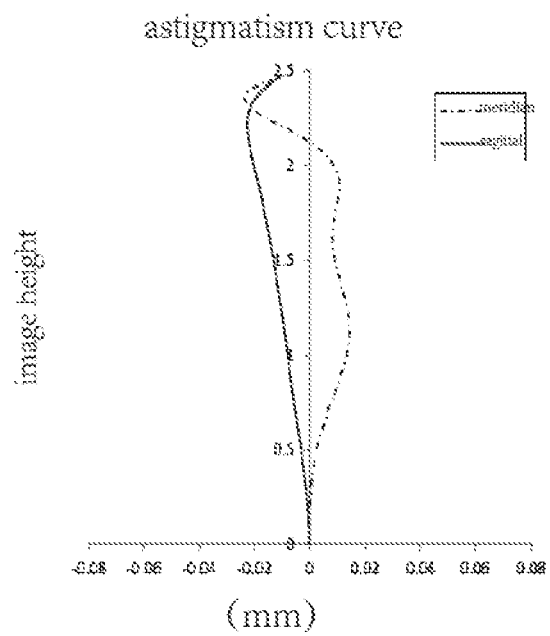
FIG. 3 is the astigmatism diagram of the seven-lens wide-angle camera lens of the first embodiment.
Figure 4:
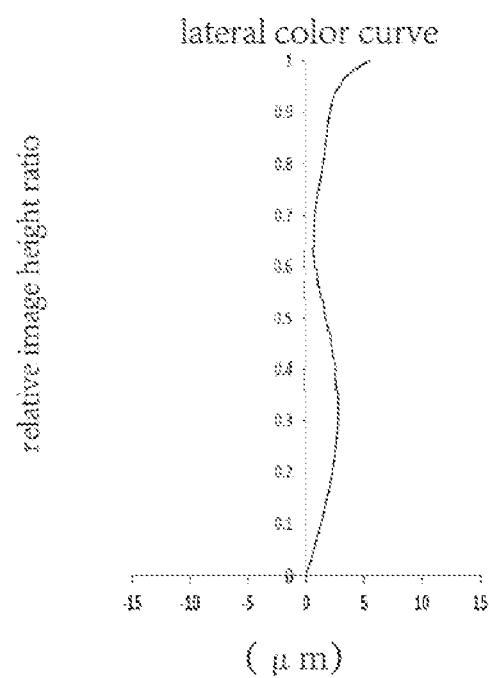
FIG. 4 is the ratio chromatism diagram of the seven-lens wide-angle camera lens of the first embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 2, 3 and 4, and maintains good manufacturability while realizing miniaturization.

The Second Embodiment

Figure 5:
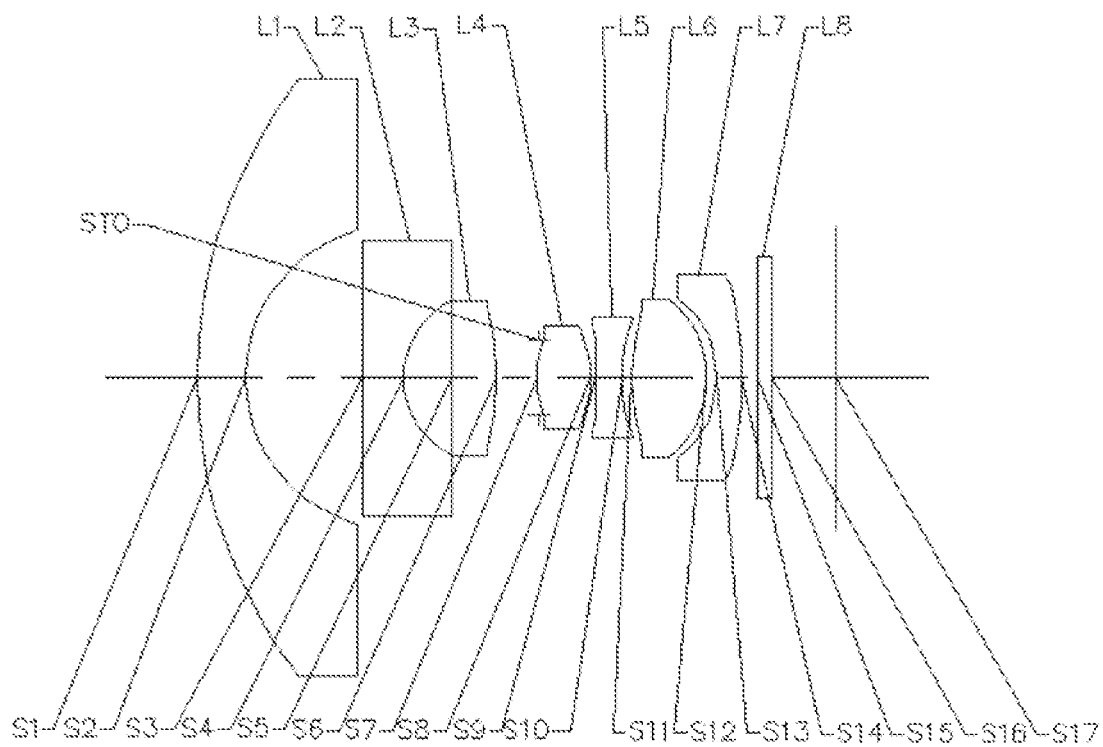
FIG. 5 is the structural schematic diagram of the seven-lens wide-angle camera lens of the second embodiment.

The seven-lens wide-angle camera lens of the present embodiment, as shown by FIG. 5, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a negative refractive power, a sixth optical lens L6 that has a positive refractive power and whose image side surface is a convex surface, a seventh optical lens L7 that has a negative refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
|---|---|
| Effective focal length of first optical lens: f1 (mm) | −4.58 |
| Effective focal length of second optical lens: f2 (mm) | −2.53 |
| Effective focal length of third optical lens: f3 (mm) | 5.25 |
| Effective focal length of fourth optical lens: f4 (mm) | 2.01 |
| Effective focal length of fifth optical lens: f5 (mm) | −2.87 |
| Effective focal length of sixth optical lens: f6 (mm) | 2.03 |
| Effective focal length of seventh optical lens: f7 (mm) | −4.50 |
| Effective focal length of seven-piece wide-angle camera lens: f (mm) | 1.17 |
| Stop value: Fno | 2.60 |
| Semiangular field: HFOV (°) | 106 |
| CT3/TTL | 0.07 |
| f6/f7 | −0.45 |
| f4/f | 1.72 |
| ImgH/f | 2.01 |
| ΣT/TTL | 0.36 |
| f1/f | −3.92 |
| CT3/CT6 | 0.59 |
| CT5/CT6 | 0.34 |
| DT31/DT62 | 0.97 | wherein: CT3 is the center thickness of the third optical lens that is on the optical axis; CT5 is the center thickness of the third optical lens that is on the optical axis; CT6 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; DT31 is the effective radius of the object side surface of the third optical lens; and DT62 is the effective radius of the image side surface of the sixth optical lens.

In order to realize the above design parameters, the detailed design that is employed by the seven-lens wide-angle camera lens of the present embodiment can be seen in the following table:

| Surface number | Surface type | Curvature | Thickness | Material | Conic Coefficient |
|---|---|---|---|---|---|
| OBJ | Spheric surface | Infinity | Infinity | | |
| S1 | Spheric surface | 7.7398 | 0.7496 | 1.80/46.6 | |
| S2 | Spheric surface | 2.3937 | 1.8444 | | |
| S3 | Aspheric surface | 325.7795 | 0.6389 | 1.54/56.1 | 0.0000 |
| S4 | Aspheric surface | 1.3740 | 0.7516 | | 0.0000 |
| S5 | Spheric surface | 74.4650 | 0.6930 | 1.85/23.8 | |
| S6 | Spheric surface | −4.7566 | 0.6670 | | |
| STO | Spheric surface | Infinity | −0.0133 | | |
| S7 | Aspheric surface | 2.1195 | 0.8275 | 1.58/59.5 | 0.0000 |
| S8 | Aspheric surface | −2.2723 | 0.1000 | | 0.0000 |
| S9 | Aspheric surface | −18.0518 | 0.4000 | 1.76/26.6 | 0.0000 |
| S10 | Aspheric surface | 2.5387 | 0.1460 | | 0.0000 |
| S11 | Aspheric surface | 2.7889 | 1.1841 | 1.58/59.5 | 0.0000 |
| S12 | Aspheric surface | −1.7512 | 0.1438 | | 0.0000 |
| S13 | Aspheric surface | −1.9998 | 0.4000 | 1.64/23.5 | 0.0000 |
| S14 | Aspheric surface | −6.9016 | 0.2573 | | 0.0000 |
| S15 | Spheric surface | Infinity | 0.2100 | 1.52/64.2 | |
| S16 | Spheric surface | Infinity | 1.0000 | | |
| S17 | Spheric surface | Infinity | | | |

The aspheric high order aberration coefficients (A4, A6, A8, A10 and A12) of the aspheric lens in the seven-lens wide-angle camera lens of the present embodiment can be seen in the following table:

| Surface number | A4 | A6 | A8 | A10 | A12 |
|---|---|---|---|---|---|
| S3 | 3.3498E−03 | −1.6339E−03 | 1.7581E−04 | −2.1854E−06 | 1.2144E−18 |
| S4 | 1.2573E−02 | 1.3130E−04 | 1.3540E−02 | −1.1539E−02 | −1.5106E−13 |
| S7 | −1.2836E−02 | −3.4278E−02 | 7.3733E−02 | −1.9114E−01 | 1.9368E−24 |
| S8 | −2.3725E−02 | −8.0990E−02 | 5.4079E−02 | −1.1062E−01 | 0.0000E+00 |
| S9 | −3.4623E−02 | −6.4064E−02 | −1.7182E−02 | −2.2183E−02 | −9.0495E−25 |
| S10 | 0.0000E+00 | 0.0000E+00 | 0.0000E+00 | 0.0000E+00 | 0.0000E+00 |
| S11 | −6.0193E−02 | 2.7373E−02 | −1.0256E−02 | 9.5676E−04 | 0.0000E+00 |
| S12 | −3.3028E−02 | 0.0000E+00 | 0.0000E+00 | 0.0000E+00 | 0.0000E+00 |
| S13 | −5.5439E−02 | −8.0660E−03 | 6.7395E−03 | −7.6196E−03 | −1.3645E−22 |
| S14 | 1.4157E−03 | 2.0896E−03 | −3.0074E−03 | 3.1169E−04 | 0.0000E+00 |

Figure 6:
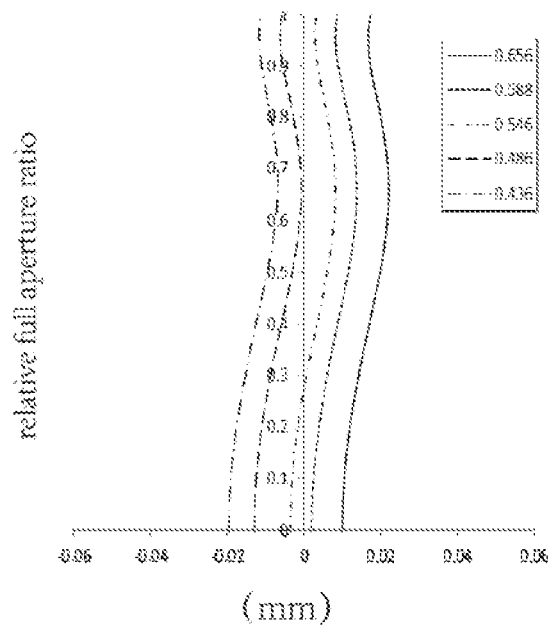
FIG. 6 is the axis chromatic aberration diagram of the seven-lens wide-angle camera lens of the second embodiment.
Figure 7:
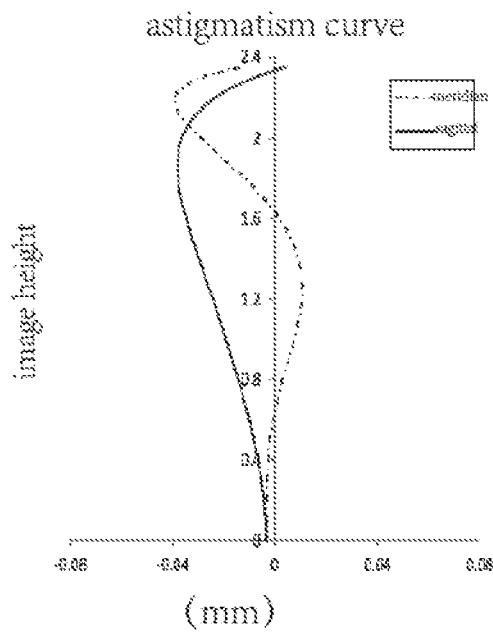
FIG. 7 is the astigmatism diagram of the seven-lens wide-angle camera lens of the second embodiment.
Figure 8:
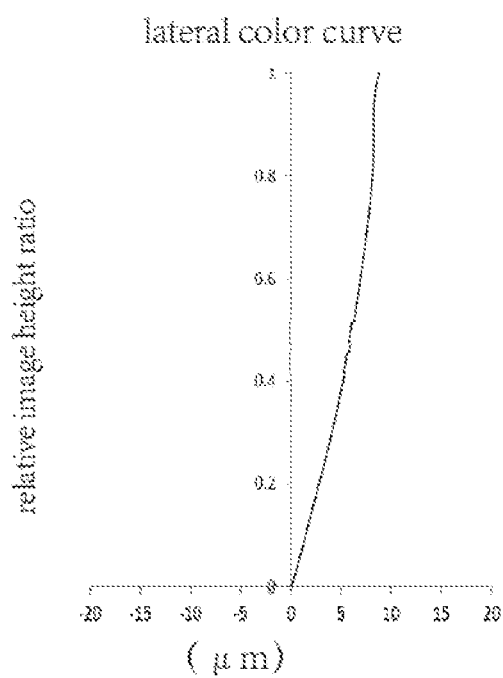
FIG. 8 is the ratio chromatism diagram of the seven-lens wide-angle camera lens of the second embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 6, 7 and 8, and maintains good manufacturability while realizing miniaturization.

The Third Embodiment

Figure 9:
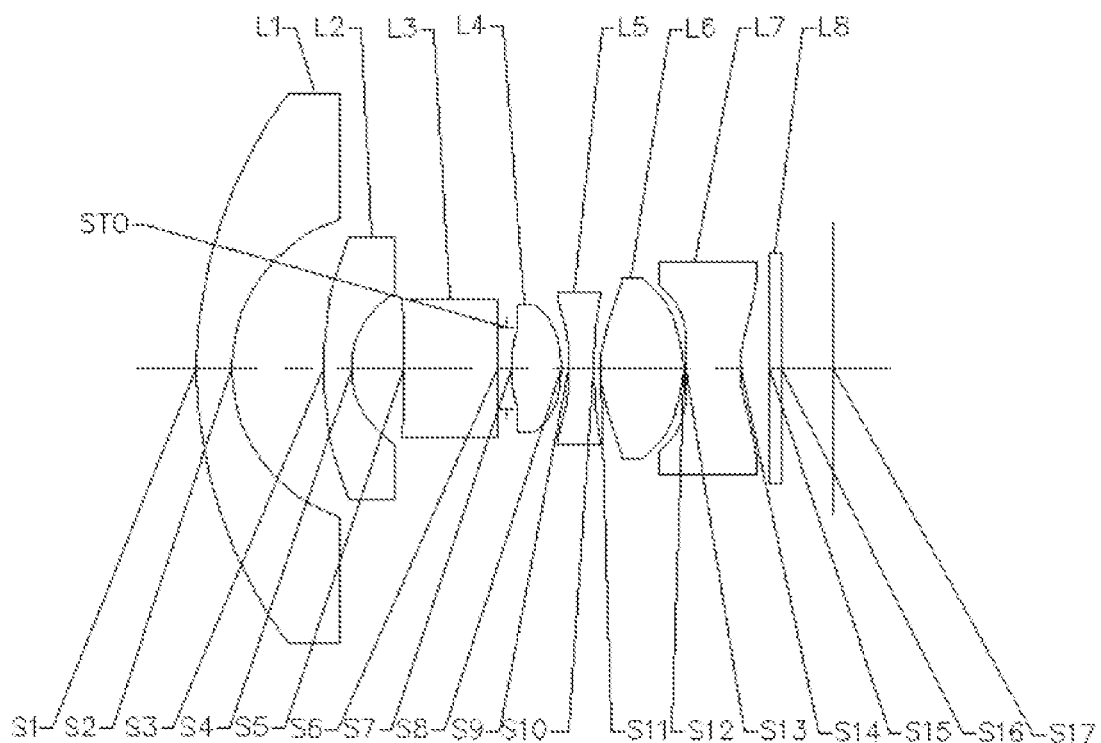
FIG. 9 is the structural schematic diagram of the seven-lens wide-angle camera lens of the third embodiment.

The seven-lens wide-angle camera lens of the present embodiment, as shown by FIG. 9, comprises, along the optical axis successively from the object side to the image side: a first optical lens L1 that has a negative refractive power, a second optical lens L2 that has a negative refractive power, a third optical lens L3 that has a negative refractive power, a fourth optical lens L4 that has a positive refractive power, a fifth optical lens L5 that has a negative refractive power, a sixth optical lens L6 that has a positive refractive power and whose image side surface is a convex surface, a seventh optical lens L7 that has a negative refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16.

The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
|---|---|
| Effective focal length of first optical lens: f1 (mm) | −5.18 |
| Effective focal length of second optical lens: f2 (mm) | −3.33 |
| Effective focal length of third optical lens: f3 (mm) | −42.35 |
| Effective focal length of fourth optical lens: f4 (mm) | 2.05 |

-continued

| Name | Numerical value |
|---|---|
| Effective focal length of fifth optical lens: f5 (mm) | −4.00 |
| Effective focal length of sixth | 2.07 |

-continued

| Name | Numerical value |
|---|---|
| optical lens: f6 (mm) | |
| Effective focal length of seventh optical lens: f7 (mm) | −3.12 |
| Effective focal length of seven-piece wide-angle camera lens: f (mm) | 1.29 |
| Stop value: Fno | 2.39 |
| Semiangular field: HFOV (°) | 100 |
| CT3/TTL | 0.15 |
| f6/f7 | −0.66 |
| f4/f | 1.58 |
| ImgH/f | 1.75 |
| ΣT/TTL | 0.28 |
| f1/f | −4.00 |
| CT3/CT6 | 1.13 |
| CT5/CT6 | 0.31 |
| DT31/DT62 | 0.76 | wherein: CT3 is the center thickness of the third optical lens that is on the optical axis; CT5 is the center thickness of the third optical lens that is on the optical axis; CT6 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; DT31 is the effective radius of the object side surface of the third optical lens; and DT62 is the effective radius of the image side surface of the sixth optical lens.

In order to realize the above design parameters, the detailed design information that is employed by the seven-lens wide-angle camera lens of the present embodiment can be seen in the following table:

| Surface number | Surface type | Curvature | Thickness | Material | Conic Coefficient |
|---|---|---|---|---|---|
| OBJ | Spheric surface | Infinity | Infinity | | |
| S1 | Spheric surface | 7.1877 | 0.5477 | 1.75/52.2 | |
| S2 | Spheric surface | 2.4579 | 1.4416 | | |
| S3 | Aspheric surface | 6.2242 | 0.4400 | 1.54/56.1 | 0.0000 |
| S4 | Aspheric surface | 1.3724 | 0.8356 | | 0.0000 |
| S5 | Aspheric surface | −4526.7170 | 1.4692 | 1.85/23.8 | 0.0000 |
| S6 | Aspheric surface | 36.5086 | 0.1376 | | 0.0000 |
| STO | Spheric surface | Infinity | 0.0773 | | |
| S7 | Aspheric surface | 2.1734 | 0.7760 | 1.54/56.1 | 0.0000 |
| S8 | Aspheric surface | −2.0235 | 0.1215 | | 0.0000 |
| S9 | Aspheric surface | −3.8386 | 0.4000 | 1.64/23.5 | 0.0000 |
| S10 | Aspheric surface | 8.2626 | 0.1000 | | 0.0000 |
| S11 | Aspheric surface | 1.8782 | 1.2998 | 1.54/56.1 | 0.0000 |
| S12 | Aspheric surface | −2.1562 | 0.0500 | | 0.0000 |
| S13 | Aspheric surface | −51.1045 | 0.8553 | 1.64/23.5 | 0.0000 |
| S14 | Aspheric surface | 2.1108 | 0.4385 | | 0.0000 |
| S15 | Spheric surface | Infinity | 0.2100 | 1.52/64.2 | |
| S16 | Spheric surface | Infinity | 0.8000 | | |
| S17 | Spheric surface | Infinity | | | |

The aspheric high order aberration coefficients (A4, A6, A8, A10 and A12) of the aspheric lens in the seven-lens wide-angle camera lens of the present embodiment can be seen in the following table:

| Surface number | A4 | A6 | A8 | A10 | A12 |
|---|---|---|---|---|---|
| S3 | 5.9459E-03 | −1.9830E-03 | 2.3054E-04 | 1.9966E-05 | 2.4050E-16 |
| S4 | 1.2939E-03 | −4.7992E-03 | 5.3615E-03 | −5.0197E-03 | −5.3010E-14 |
| S5 | −2.7051E-02 | −3.0879E-03 | −4.2328E-03 | −1.2598E-03 | 0.0000E+00 |
| S6 | −3.5506E-02 | 3.3726E-02 | −1.3073E-02 | 1.9071E-02 | 8.5823E-24 |
| S7 | −8.4275E-02 | −5.5939E-02 | 1.0701E-01 | −2.2955E-01 | −4.7756E-23 |
| S8 | −7.6869E-02 | −6.3484E-02 | 4.6442E-02 | −8.2910E-02 | 0.0000E+00 |
| S9 | −7.6679E-03 | 1.3607E-02 | −1.3119E-01 | 9.7450E-02 | 2.4022E-23 |
| S10 | 0.0000E+00 | 0.0000E+00 | 0.0000E+00 | 0.0000E+00 | 0.0000E+00 |
| S11 | −8.7888E-02 | 3.1403E-02 | −1.3282E-02 | 7.9855E-04 | 0.0000E+00 |
| S12 | −2.4158E-02 | 0.0000E+00 | 0.0000E+00 | 0.0000E+00 | 0.0000E+00 |
| S13 | −1.4004E-01 | −9.8316E-03 | 4.1456E-03 | 8.3872E-04 | 9.2110E-22 |
| S14 | −1.0259E-01 | 1.6743E-02 | −1.7116E-03 | −2.0611E-04 | 0.0000E+00 |

Figure 10:
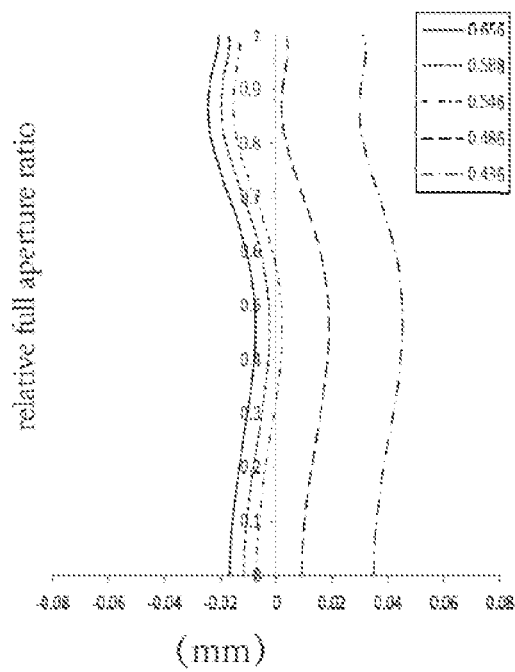
FIG. 10 is the axis chromatic aberration diagram of the seven-lens wide-angle camera lens of the third embodiment.
Figure 11:
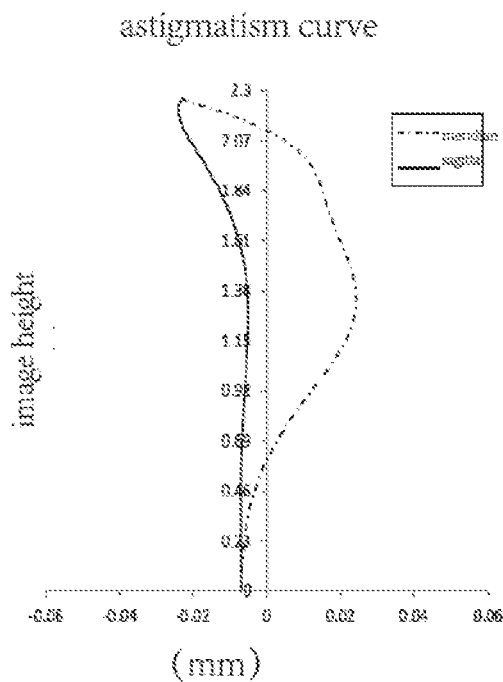
FIG. 11 is the astigmatism diagram of the seven-lens wide-angle camera lens of the third embodiment.
Figure 12:
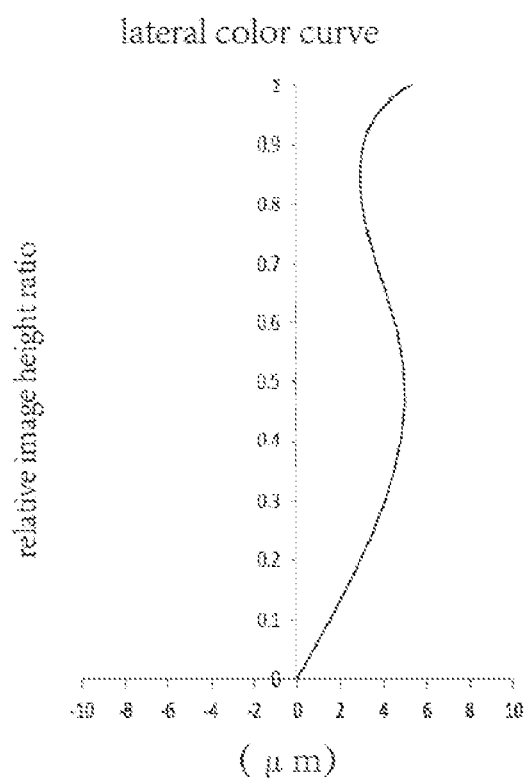
FIG. 12 is the ratio chromatism diagram of the seven-lens wide-angle camera lens of the third embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 10, 11 and 12, and maintains good manufacturability while realizing miniaturization.

The Fourth Embodiment

Figure 13:
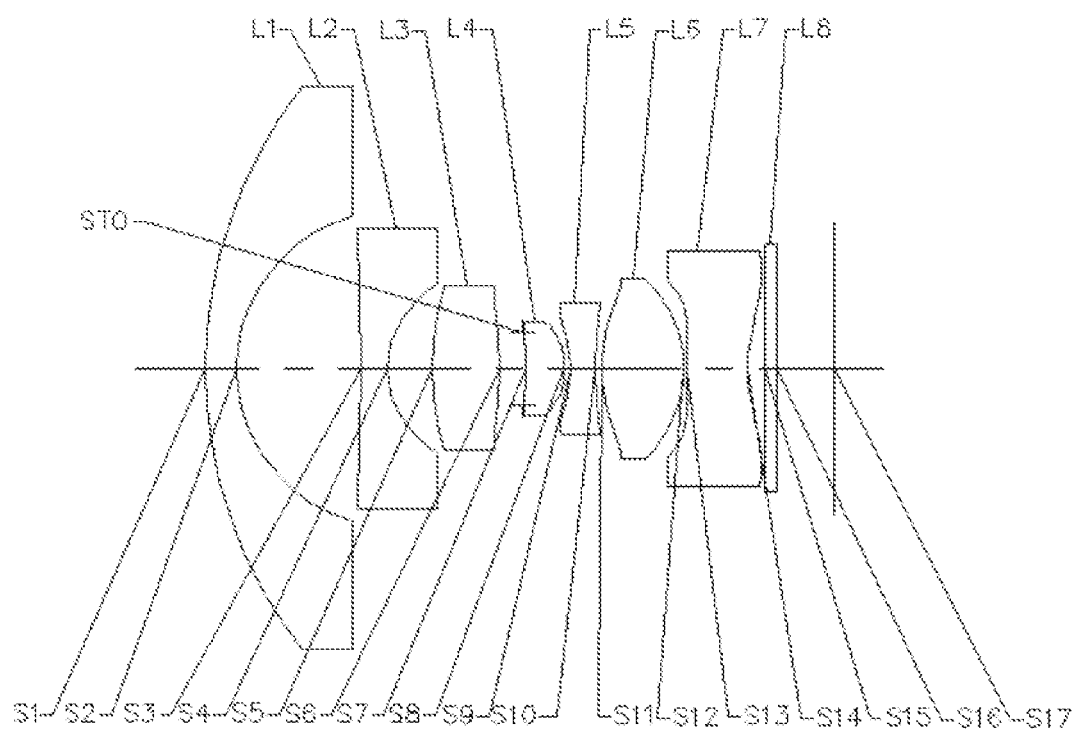
FIG. 13 is the structural schematic diagram of the seven-lens wide-angle camera lens of the fourth embodiment.

The seven-lens wide-angle camera lens of the present embodiment, as shown by FIG. 13, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a negative refractive power, a sixth optical lens L6 that has a positive refractive power and whose image side surface is a convex surface, a seventh optical lens L7 that has a negative refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
| --- | --- |
| Effective focal length of first optical lens: f1 (mm) | −5.04 |
| Effective focal length of second optical lens: f2 (mm) | −2.72 |
| Effective focal length of third optical lens: f3 (mm) | 3.32 |
| Effective focal length of fourth optical lens: f4 (mm) | 2.34 |
| Effective focal length of fifth optical lens: f5 (mm) | −2.28 |
| Effective focal length of sixth optical lens: f6 (mm) | 2.17 |
| Effective focal length of seventh optical lens: f7 (mm) | −5.33 |
| Effective focal length of seven-piece wide-angle camera lens: f (mm) | 1.26 |
| Stop value: Fno | 2.39 |
| Semiangular field: HFOV (°) | 106 |
| CT3/TTL | 0.11 |
| f6/f7 | −0.41 |
| f4/f | 1.86 |
| ImgH/f | 1.87 |
| ΣT/TTL | 0.35 |
| f1/f | −4.00 |
| CT3/CT6 | 0.82 |
| CT5/CT6 | 0.30 |
| DT31/DT62 | 0.91 | wherein: CT3 is the center thickness of the third optical lens that is on the optical axis; CT5 is the center thickness of the third optical lens that is on the optical axis; CT6 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; DT31 is the effective radius of the object side surface of the third optical lens; and DT62 is the effective radius of the image side surface of the sixth optical lens.

In order to realize the above design parameters, the detailed design that is employed by the seven-lens wide-angle camera lens of the present embodiment can be seen in the following table:

| Surface number | Surface type | Curvature | Thickness | Material | Conic Coefficient |
| --- | --- | --- | --- | --- | --- |
| OBJ | Spheric surface | Infinity | Infinity | | |
| S1 | Spheric surface | 7.4133 | 0.5000 | 1.80/46.6 | |
| S2 | Spheric surface | 2.5486 | 1.9883 | | |
| S3 | Aspheric surface | −66.3631 | 0.4400 | 1.54/56.1 | 0.0000 |
| S4 | Aspheric surface | 1.5224 | 0.7111 | | 0.0000 |
| S5 | Spheric surface | 4.2737 | 1.0821 | 1.85/23.9 | |
| S6 | Spheric surface | −7.4348 | 0.3660 | | |
| STO | Spheric surface | Infinity | 0.0563 | | |
| S7 | Aspheric surface | −89.2166 | 0.6266 | 1.54/56.1 | 0.0000 |
| S8 | Aspheric surface | −1.2641 | 0.1000 | | 0.0000 |
| S9 | Aspheric surface | −1.8085 | 0.4000 | 1.64/23.5 | 0.0000 |
| S10 | Aspheric surface | 8.6418 | 0.1000 | | 0.0000 |
| S11 | Aspheric surface | 2.0866 | 1.3195 | 1.54/56.1 | 0.0000 |
| S12 | Aspheric surface | −2.1348 | 0.0499 | | 0.0000 |
| S13 | Aspheric surface | 7.3936 | 0.9772 | 1.64/23.5 | 0.0000 |
| S14 | Aspheric surface | 2.2263 | 0.2731 | | 0.0000 |
| S15 | Spheric surface | Infinity | 0.2100 | 1.52/64.2 | |
| S16 | Spheric surface | Infinity | 0.9092 | | |
| S17 | Spheric surface | Infinity | | | |

The aspheric high order aberration coefficients (A4, A6, A8, A10 and A12) of the aspheric lens in the seven-lens wide-angle camera lens of the present embodiment can be seen in the following table:

| Surface number | A4 | A6 | A8 | A10 | A12 |
|---|---|---|---|---|---|
| S3  |  3.2384E−03 | −1.3345E−03 |  1.7949E−04 | −6.1340E−06 |  8.6705E−18 |
| S4  |  7.2190E−03 |  9.3709E−04 | −4.2919E−04 | −2.6293E−03 | −5.2948E−14 |
| S7  | −1.4513E−01 | −1.6804E−01 |  6.2345E−03 | −7.1337E−01 | −4.7505E−23 |
| S8  | −9.9961E−02 | −1.9314E−02 |  5.1339E−02 | −2.6522E−01 |  0.0000E+00 |
| S9  |  4.0898E−02 |  6.0881E−02 | −1.0156E−01 |  8.2034E−02 |  2.8852E−23 |
| S10 |  0.0000E+00 |  0.0000E+00 |  0.0000E+00 |  0.0000E+00 |  0.0000E+00 |
| S11 | −8.4362E−02 |  3.2868E−02 | −1.3103E−02 |  1.7815E−03 |  0.0000E+00 |
| S12 | −1.0861E−02 |  0.0000E+00 |  0.0000E+00 |  0.0000E+00 |  0.0000E+00 |
| S13 | −1.0453E−01 | −5.6248E−03 |  2.5209E−03 | −6.8244E−04 |  1.7579E−21 |
| S14 | −9.4734E−02 |  1.3421E−02 | −9.6743E−04 | −1.6336E−04 |  0.0000E+00 |

Figure 14:
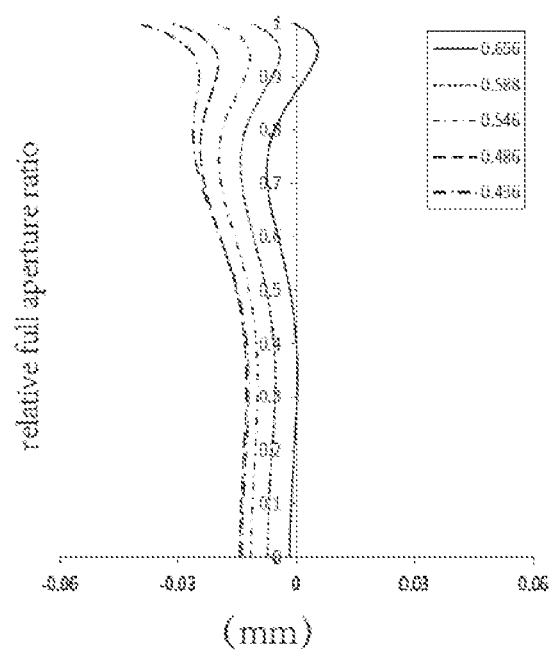
FIG. 14 is the axis chromatic aberration diagram of the seven-lens wide-angle camera lens of the fourth embodiment.
Figure 15:
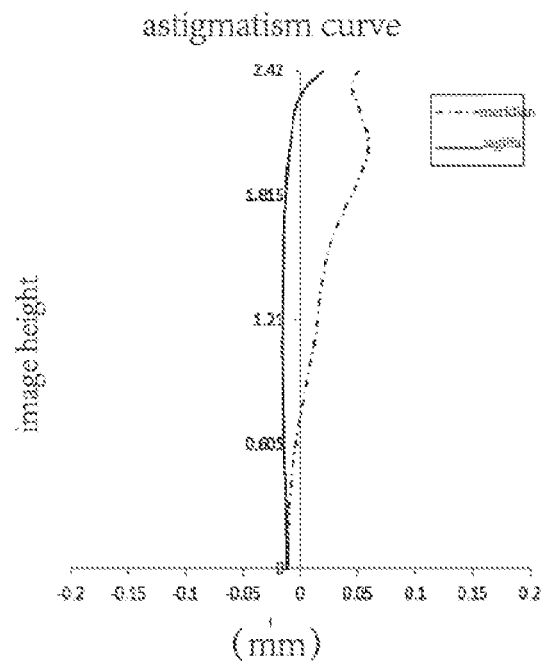
FIG. 15 is the astigmatism diagram of the seven-lens wide-angle camera lens of the fourth embodiment.
Figure 16:
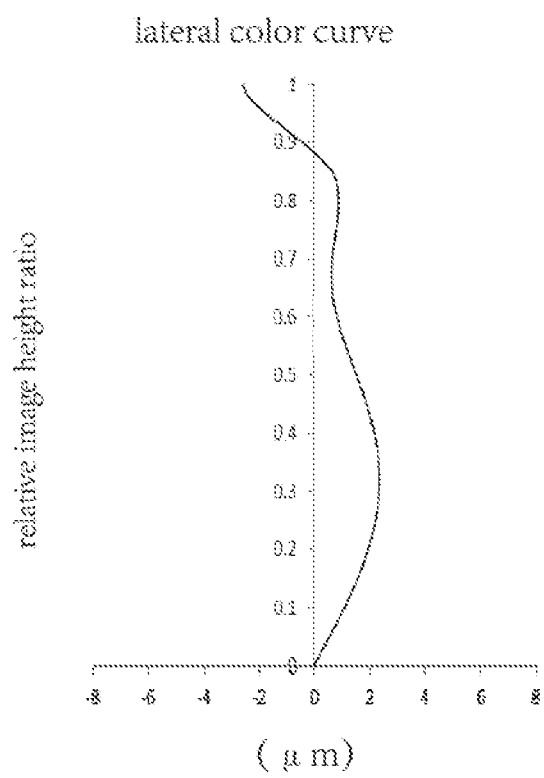
FIG. 16 is the ratio chromatism diagram of the seven-lens wide-angle camera lens of the fourth embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 14, 15 and 16, and maintains good manufacturability while realizing miniaturization.

The Fifth Embodiment

Figure 17:
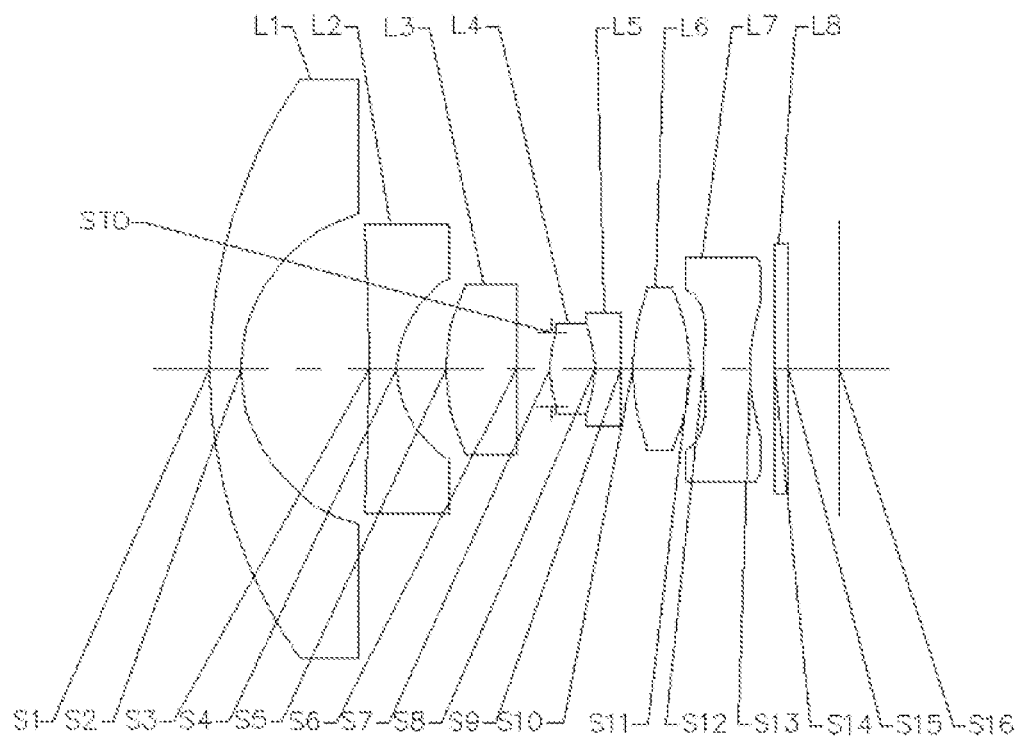
FIG. 17 is the structural schematic diagram of the seven-lens wide-angle camera lens of the fifth embodiment.

The seven-lens wide-angle camera lens of the present embodiment, as shown by FIG. 17, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a negative refractive power, a sixth optical lens L6 that has a positive refractive power and whose image side surface is a convex surface, a seventh optical lens L7 that has a negative refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an image side surface S9 and its object side surface coincides with the image side surface S8 of the fourth optical lens L4, the sixth optical lens L6 has an object side surface S10 and an image side surface S11, the seventh optical lens L7 has an object side surface S12 and an image side surface S13, and the optical filter L8 has an object side surface S14 and an image side surface S15. The imaging plane S16 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
|---|---|
| Effective focal length of first optical lens: f1 (mm) | −4.85 |
| Effective focal length of second optical lens: f2 (mm) | −2.73 |
| Effective focal length of third optical lens: f3 (mm) | 3.62 |
| Effective focal length of fourth optical lens: f4 (mm) | 1.92 |
| Effective focal length of fifth optical lens: f5 (mm) | −2.16 |
| Effective focal length of sixth optical lens: f6 (mm) | 2.35 |
| Effective focal length of seventh optical lens: f7 (mm) | −6.87 |
| Effective focal length of seven-piece wide-angle camera lens: f (mm) | 1.24 |
| Stop value: Fno | 2.34 |
| Semiangular field: HFOV (°) | 105 |
| CT3/TTL | 0.11 |
| f6/f7 | −0.34 |
| f4/f | 1.55 |
| ImgH/f | 1.88 |
| ΣT/TTL | 0.38 |
| f1/f | −3.90 |
| CT3/CT6 | 1.25 |
| CT5/CT6 | 0.45 |
| DT31/DT62 | 1.05 | wherein: CT3 is the center thickness of the third optical lens that is on the optical axis; CT5 is the center thickness of the third optical lens that is on the optical axis; CT6 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; DT31 is the effective radius of the object side surface of the third optical lens; and DT62 is the effective radius of the image side surface of the sixth optical lens.

In order to realize the above design parameters, the detailed design that is employed by the seven-lens wide-angle camera lens of the present embodiment can be seen in the following table:

| Surface number | Surface type | Curvature | Thickness | Material | Conic Coefficient |
|---|---|---|---|---|---|
| OBJ | Spheric surface | Infinity | Infinity | | |
| S1 | Spheric surface | 8.0858 | 0.5000 | 1.80/46.6 | |
| S2 | Spheric surface | 2.5655 | 2.0328 | | |
| S3 | Aspheric surface | −24.6059 | 0.4400 | 1.54/56.1 | 0.0000 |
| S4 | Aspheric surface | 1.5969 | 0.7908 | | 0.0000 |
| S5 | Spheric surface | 3.0522 | 1.1142 | 1.85/23.8 | |
| S6 | Spheric surface | 181.5000 | 0.5649 | | |
| STO | Spheric surface | Infinity | −0.0227 | | |
| S7 | Spheric surface | 2.3422 | 0.7088 | 1.60/61.6 | |
| S8 | Spheric surface | −2.0000 | 0.0000 | | |
| S9 | Spheric surface | −2.0000 | 0.4000 | 1.84/24.0 | |
| S10 | Spheric surface | 24.8032 | 0.2115 | | |
| S11 | Spheric surface | 3.8136 | 0.8921 | 1.76/52.3 | |
| S12 | Spheric surface | −3.0114 | 0.2180 | | |
| S13 | Aspheric surface | 5.1603 | 0.7397 | 1.64/23.5 | 0.0000 |
| S14 | Aspheric surface | 2.2522 | 0.3998 | | 0.0000 |
| S15 | Spheric surface | Infinity | 0.2100 | 1.52/64.2 | |
| S16 | Spheric surface | Infinity | 0.8000 | | |
| S17 | Spheric surface | Infinity | | | |

The aspheric high order aberration coefficients ($A_4$, $A_6$, $A_8$, $A_{10}$ and $A_{12}$) of the aspheric lens in the seven-lens wide-angle camera lens of the present embodiment can be seen in the following table:

| Surface number | A4 | A6 | A8 | A10 | A12 |
|---|---|---|---|---|---|
| S3 | 5.6683E−03 | −1.5309E−03 | 1.6966E−04 | −4.5584E−06 | 9.0560E−18 |
| S4 | 3.5779E−03 | −8.6993E−03 | 3.8704E−03 | −2.1274E−03 | −5.2948E−14 |
| S13 | −1.2194E−01 | −5.4918E−03 | −9.2776E−03 | −1.2780E−03 | 5.1226E−19 |
| S14 | −9.3596E−02 | 9.1440E−03 | −8.0708E−04 | −1.2632E−04 | 0.0000E+00 |

Figure 18:
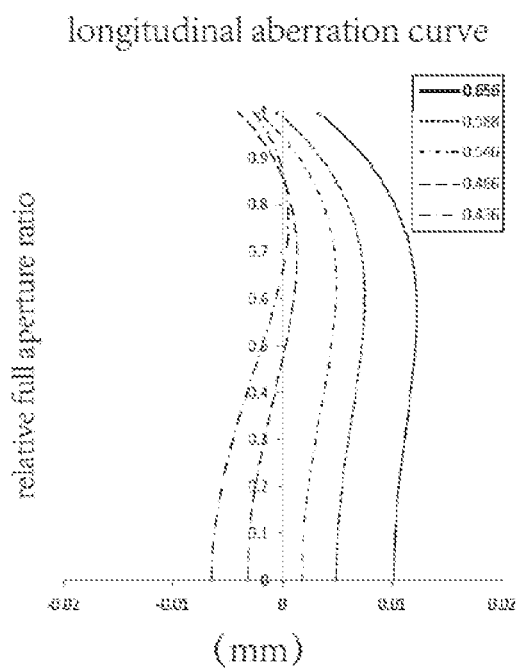
FIG. 18 is the axis chromatic aberration diagram of the seven-lens wide-angle camera lens of the fifth embodiment.
Figure 19:
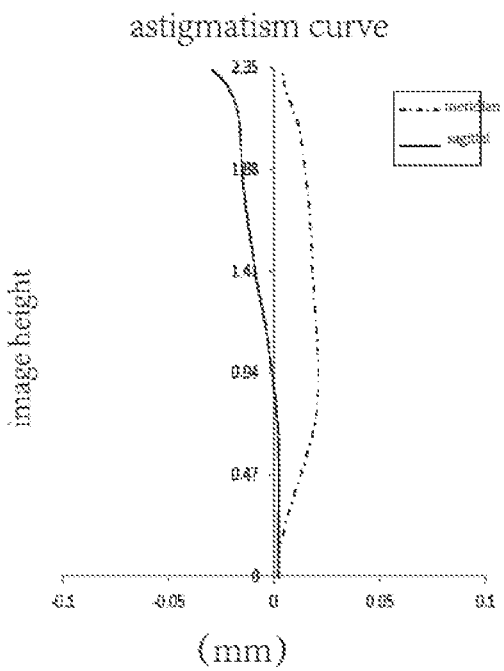
FIG. 19 is the astigmatism diagram of the seven-lens wide-angle camera lens of the fifth embodiment.
Figure 20:
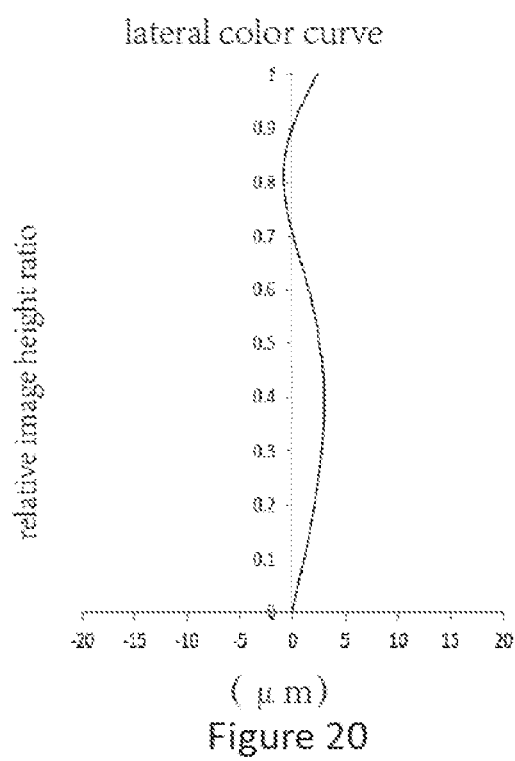
FIG. 20 is the ratio chromatism diagram of the seven-lens wide-angle camera lens of the fifth embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 18, 19 and 20, and maintains good manufacturability while realizing miniaturization.

The Sixth Embodiment

Figure 21:
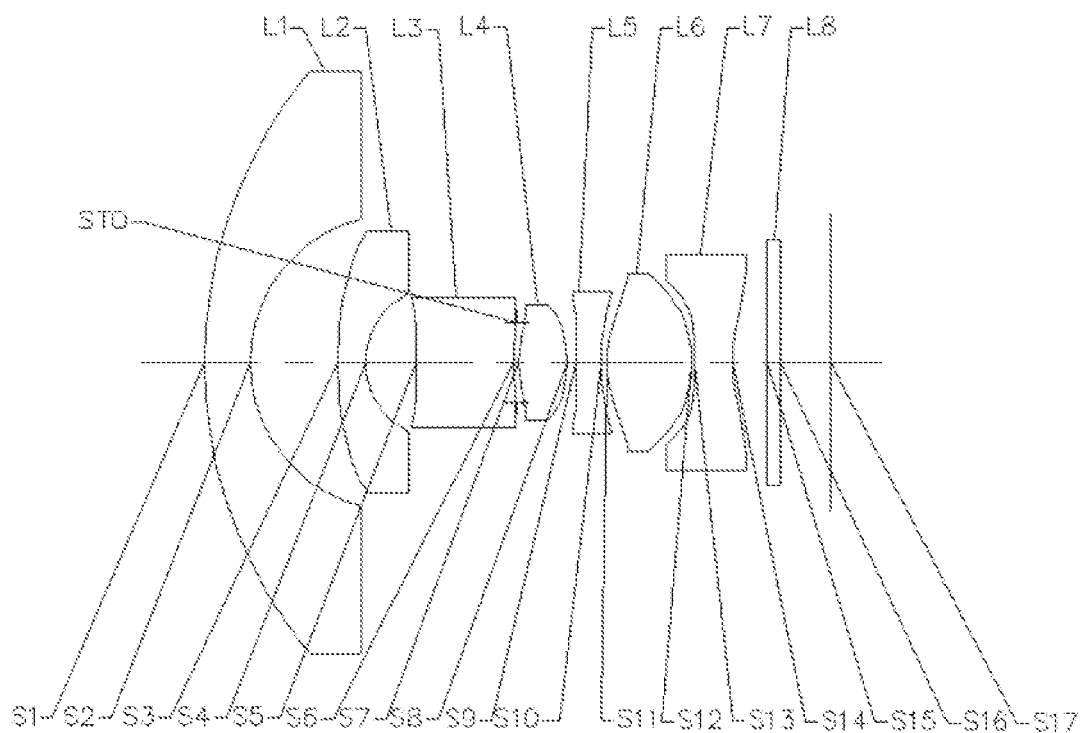
FIG. 21 is the structural schematic diagram of the seven-lens wide-angle camera lens of the sixth embodiment.

The seven-lens wide-angle camera lens of the present embodiment, as shown by FIG. 21, comprises, along the optical axis successively from the object side to the image side: a first optical lens L1 that has a negative refractive power, a second optical lens L2 that has a negative refractive power, a third optical lens L3 that has a negative refractive power, a fourth optical lens L4 that has a positive refractive power, a fifth optical lens L5 that has a negative refractive power, a sixth optical lens L6 that has a positive refractive power and whose image side surface is a convex surface, a seventh optical lens L7 that has a negative refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
|---|---|
| Effective focal length of first optical lens: f1 (mm) | −4.97 |
| Effective focal length of second optical lens: f2 (mm) | −2.87 |
| Effective focal length of third optical lens: f3 (mm) | −14.51 |
| Effective focal length of fourth optical lens: f4 (mm) | 2.05 |
| Effective focal length of fifth optical lens: f5 (mm) | −5.79 |
| Effective focal length of sixth optical lens: f6 (mm) | 2.02 |
| Effective focal length of seventh optical lens: f7 (mm) | −3.09 |
| Effective focal length of seven-piece wide-angle camera lens: f (mm) | 1.24 |
| Stop value: Fno | 2.39 |
| Semiangular field: HFOV (°) | 105 |
| CT3/TTL | 0.17 |
| f6/f7 | −0.66 |
| f4/f | 1.65 |
| ImgH/f | 1.88 |
| ΣT/TTL | 0.31 |
| f1/f | −4.00 |
| CT3/CT6 | 1.17 |
| CT5/CT6 | 0.30 |
| DT31/DT62 | 0.73 | wherein: CT3 is the center thickness of the third optical lens that is on the optical axis; CT5 is the center thickness of the third optical lens that is on the optical axis; CT6 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; DT31 is the effective radius of the object side surface of the third optical lens; and DT62 is the effective radius of the image side surface of the sixth optical lens.

In order to realize the above design parameters, the detailed design that is employed by the seven-lens wide-angle camera lens of the present embodiment can be seen in the following table:

| Surface number | Surface type | Curvature | Thickness | Material | Conic Coefficient |
|---|---|---|---|---|---|
| OBJ | Spheric surface | Infinity | Infinity | | |
| S1 | Spheric surface | 7.3024 | 0.7255 | 1.76/52.3 | |
| S2 | Spheric surface | 2.3790 | 1.4065 | | |
| S3 | Aspheric surface | 8.0104 | 0.4400 | 1.54/56.1 | 0.0000 |
| S4 | Aspheric surface | 1.2873 | 0.7969 | | 0.0000 |
| S5 | Aspheric surface | 1000.0000 | 1.5795 | 1.85/23.8 | 0.0000 |
| S6 | Aspheric surface | 12.2425 | 0.0362 | | 0.0000 |
| STO | Spheric surface | Infinity | 0.0322 | | |
| S7 | Aspheric surface | 2.1721 | 0.7747 | 1.54/56.1 | 0.0000 |
| S8 | Aspheric surface | −2.0226 | 0.1356 | | 0.0000 |
| S9 | Aspheric surface | 200.0000 | 0.4000 | 1.64/23.5 | 0.0000 |
| S10 | Aspheric surface | 3.6663 | 0.1000 | | 0.0000 |
| S11 | Aspheric surface | 1.8756 | 1.3490 | 1.54/56.1 | 0.0000 |
| S12 | Aspheric surface | −2.0084 | 0.0500 | | 0.0000 |
| S13 | Aspheric surface | −27.2528 | 0.6008 | 1.64/23.5 | 0.0000 |
| S14 | Aspheric surface | 2.1702 | 0.5630 | | 0.0000 |
| S15 | Spheric surface | Infinity | 0.2100 | 1.52/64.2 | |
| S16 | Spheric surface | Infinity | 0.8000 | | |
| S17 | Spheric surface | Infinity | | | |

The aspheric high order aberration coefficients (A4, A6, A8, A10 and A12) of the aspheric lens in the seven-lens wide-angle camera lens of the present embodiment can be seen in the following table:

| Surface number | A4 | A6 | A8 | A10 | A12 |
|---|---|---|---|---|---|
| S3 | 1.9718E−02 | −4.7557E−03 | 2.4471E−04 | 6.7835E−05 | 2.4051E−16 |
| S4 | 2.6184E−02 | −2.2751E−02 | 4.8305E−02 | −2.8253E−02 | −5.3010E−14 |
| S5 | −3.2018E−02 | 5.4124E−03 | −1.9117E−02 | −1.7033E−03 | 0.0000E+00 |
| S6 | −3.5866E−02 | 6.7704E−02 | −3.9518E−02 | 2.8905E−02 | 7.2755E−24 |
| S7 | −9.5220E−02 | 2.4357E−02 | 5.1942E−02 | −1.9906E−01 | −4.7184E−23 |
| S8 | −7.7324E−02 | −2.0703E−02 | 3.4555E−02 | −1.0062E−01 | 0.0000E+00 |
| S9 | −2.3345E−02 | 2.0686E−02 | −8.3848E−02 | 2.9155E−02 | 2.2787E−23 |
| S10 | 0.0000E+00 | 0.0000E+00 | 0.0000E+00 | 0.0000E+00 | 0.0000E+00 |
| S11 | −8.4041E−02 | 2.8438E−02 | −1.3661E−02 | 1.3437E−03 | 0.0000E+00 |
| S12 | −2.6738E−02 | 0.0000E+00 | 0.0000E+00 | 0.0000E+00 | 0.0000E+00 |
| S13 | −1.5103E−01 | −5.8068E−03 | 3.5596E−03 | 2.3178E−03 | 9.4922E−22 |
| S14 | −1.0788E−01 | 1.9242E−02 | −2.3253E−03 | −5.4180E−05 | 0.0000E+00 |

Figure 22:
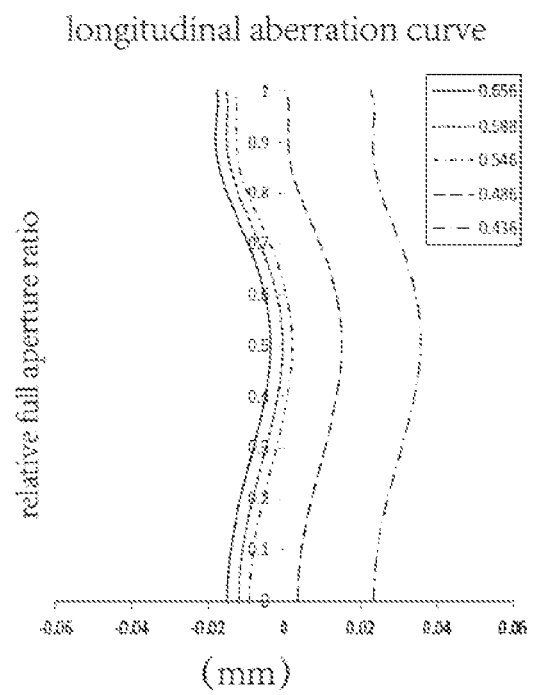
FIG. 22 is the axis chromatic aberration diagram of the seven-lens wide-angle camera lens of the sixth embodiment.
Figure 23:
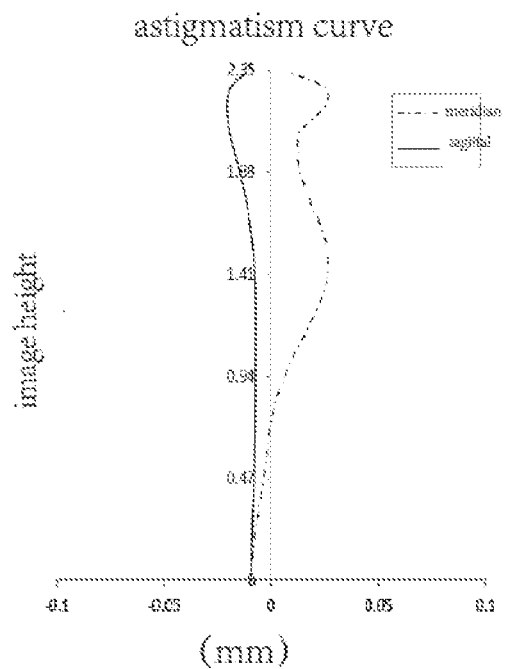
FIG. 23 is the astigmatism diagram of the seven-lens wide-angle camera lens of the sixth embodiment.
Figure 24:
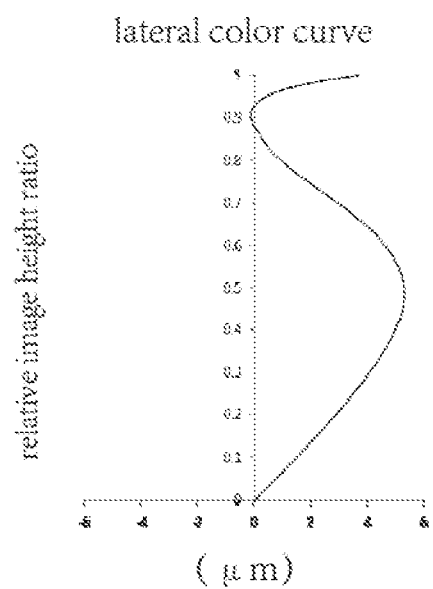
FIG. 24 is the ratio chromatism diagram of the seven-lens wide-angle camera lens of the sixth embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 22, 23 and 24, and maintains good manufacturability while realizing miniaturization.

The Seventh Embodiment

Figure 25:
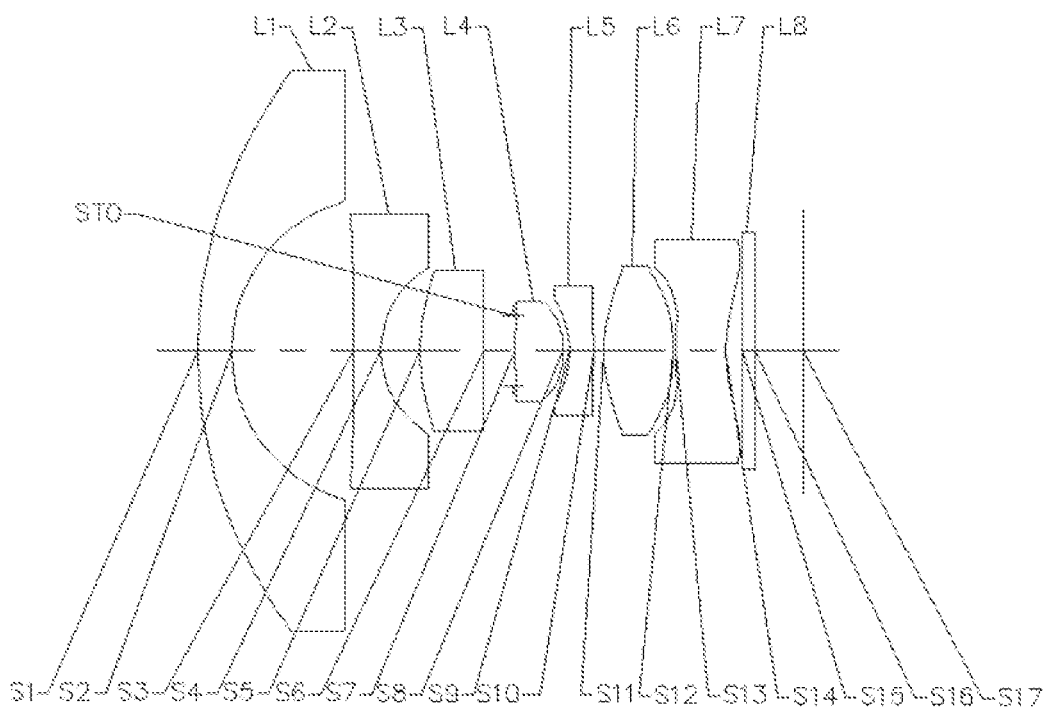
FIG. 25 is the structural schematic diagram of the seven-lens wide-angle camera lens of the seventh embodiment.

The seven-lens wide-angle camera lens of the present embodiment, as shown by FIG. 25, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a negative refractive power, a sixth optical lens L6 that has a positive refractive power and whose image side surface is a convex surface, a seventh optical lens L7 that has a negative refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
|---|---|
| Effective focal length of first optical lens: f1 (mm) | −5.00 |
| Effective focal length of second optical lens: f2 (mm) | −2.68 |
| Effective focal length of third optical lens: f3 (mm) | 4.10 |
| Effective focal length of fourth optical lens: f4 (mm) | 1.98 |
| Effective focal length of fifth optical lens: f5 (mm) | −2.71 |
| Effective focal length of sixth optical lens: f6 (mm) | 2.42 |
| Effective focal length of seventh optical lens: f7 (mm) | −4.75 |
| Effective focal length of seven-piece wide-angle camera lens: f (mm) | 1.25 |
| Stop value: Fno | 2.39 |
| Semiangular field: HFOV (°) | 105 |
| CT3/TTL | 0.11 |
| f6/f7 | −0.51 |
| f4/f | 1.58 |
| ImgH/f | 1.87 |
| ΣT/TTL | 0.38 |
| f1/f | −4.00 |
| CT3/CT6 | 0.91 |

-continued

| Name | Numerical value |
|---|---|
| CT5/CT6 | 0.35 |
| DT31/DT62 | 0.96 | wherein: CT3 is the center thickness of the third optical lens that is on the optical axis; CT5 is the center thickness of the third optical lens that is on the optical axis; CT6 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; DT31 is the effective radius of the object side surface of the third optical lens; and DT62 is the effective radius of the image side surface of the sixth optical lens.

In order to realize the above design parameters, the detailed design that is employed by the seven-lens wide-angle camera lens of the present embodiment can be seen in the following table:

| Surface number | Surface type | Curvature | Thickness | Material | Conic Coefficient |
|---|---|---|---|---|---|
| OBJ | Spheric surface | Infinity | Infinity | | |
| S1 | Spheric surface | 7.7187 | 0.5555 | 1.80/46.6 | |
| S2 | Spheric surface | 2.5656 | 2.0209 | | |
| S3 | Aspheric surface | −32.8422 | 0.4400 | 1.54/56.1 | 0.0000 |
| S4 | Aspheric surface | 1.5405 | 0.6571 | | 0.0000 |
| S5 | Spheric surface | 3.9765 | 1.0527 | 1.85/23.8 | |
| S6 | Spheric surface | −25.7928 | 0.4793 | | |
| STO | Spheric surface | Infinity | 0.0173 | | |
| S7 | Aspheric surface | 4.0103 | 0.8086 | 1.54/56.1 | 0.0000 |
| S8 | Aspheric surface | −1.3732 | 0.1000 | | 0.0000 |
| S9 | Aspheric surface | −1.5977 | 0.4000 | 1.64/23.5 | 0.0000 |
| S10 | Aspheric surface | −20.0000 | 0.1572 | | 0.0000 |
| S11 | Aspheric surface | 2.1763 | 1.1560 | 1.54/56.1 | 0.0000 |
| S12 | Aspheric surface | −2.7297 | 0.0500 | | 0.0000 |
| S13 | Aspheric surface | 8.2065 | 0.8159 | 1.64/23.5 | 0.0000 |
| S14 | Aspheric surface | 2.1479 | 0.2797 | | 0.0000 |
| S15 | Spheric surface | Infinity | 0.2100 | 1.52/64.2 | |
| S16 | Spheric surface | Infinity | 0.8000 | | |
| S17 | Spheric surface | Infinity | | | |

The aspheric high order aberration coefficients (A4, A6, A8, A10 and A12) of the aspheric lens in the seven-lens wide-angle camera lens of the present embodiment can be seen in the following table:

| Surface number | A4 | A6 | A8 | A10 | A12 |
|---|---|---|---|---|---|
| S3 | 3.0049E−03 | −1.1360E−03 | 1.9812E−04 | −9.6674E−06 | 8.4782E−18 |
| S4 | −1.3006E−03 | −7.6531E−04 | −1.4340E−03 | −1.2022E−03 | −5.2948E−14 |
| S7 | −8.9491E−02 | −1.0382E−01 | −1.3040E−02 | −4.8211E−01 | −4.7684E−23 |
| S8 | −1.0119E−01 | −4.0296E−02 | 4.8635E−02 | −1.5333E−01 | 0.0000E+00 |
| S9 | 1.5570E−02 | 2.4858E−02 | −1.0238E−01 | 1.1975E−01 | 2.2580E−23 |
| S10 | 0.0000E+00 | 0.0000E+00 | 0.0000E+00 | 0.0000E+00 | 0.0000E+00 |
| S11 | −7.1452E−02 | 3.2393E−02 | −1.3411E−02 | 2.2651E−03 | 0.0000E+00 |
| S12 | −1.2942E−02 | 0.0000E+00 | 0.0000E+00 | 0.0000E+00 | 0.0000E+00 |
| S13 | −1.2199E−01 | −7.2368E−03 | 2.3782E−03 | −1.1757E−03 | 1.4766E−21 |
| S14 | −9.7637E−02 | 1.3528E−02 | −1.3221E−03 | −1.4219E−04 | 0.0000E+00 |

Figure 26:
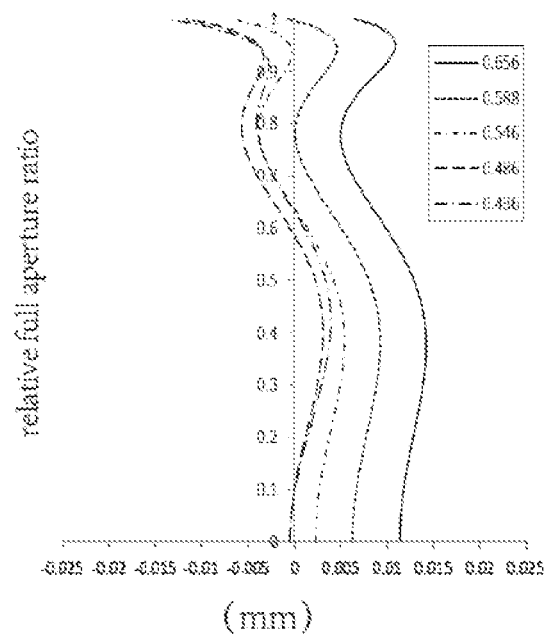
FIG. 26 is the axis chromatic aberration diagram of the seven-lens wide-angle camera lens of the seventh embodiment.
Figure 27:
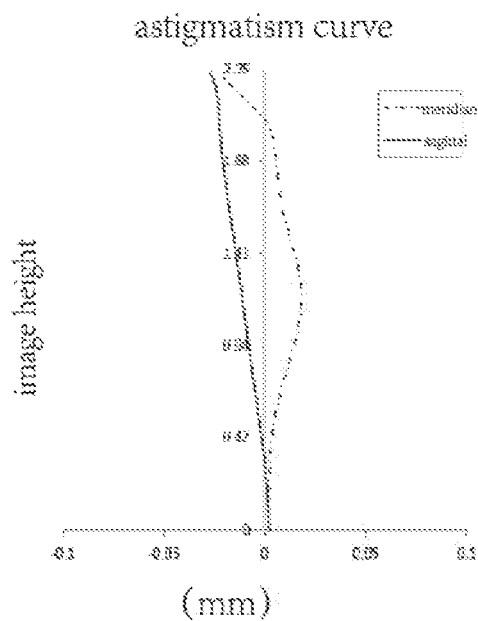
FIG. 27 is the astigmatism diagram of the seven-lens wide-angle camera lens of the seventh embodiment.
Figure 28:
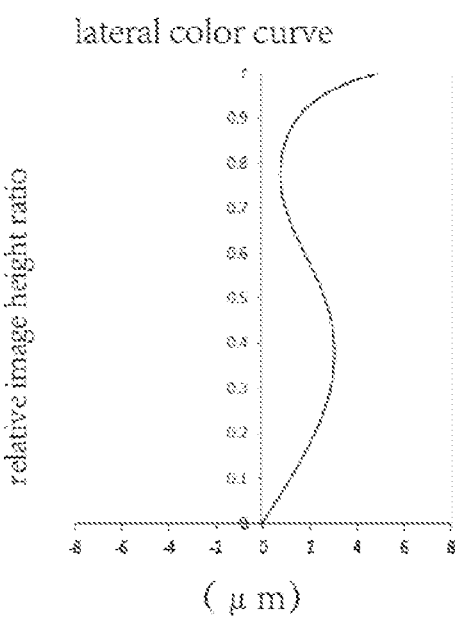
FIG. 28 is the ratio chromatism diagram of the seven-lens wide-angle camera lens of the seventh embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 26, 27 and 28, and maintains good manufacturability while realizing miniaturization.

The Eighth Embodiment

Figure 29:
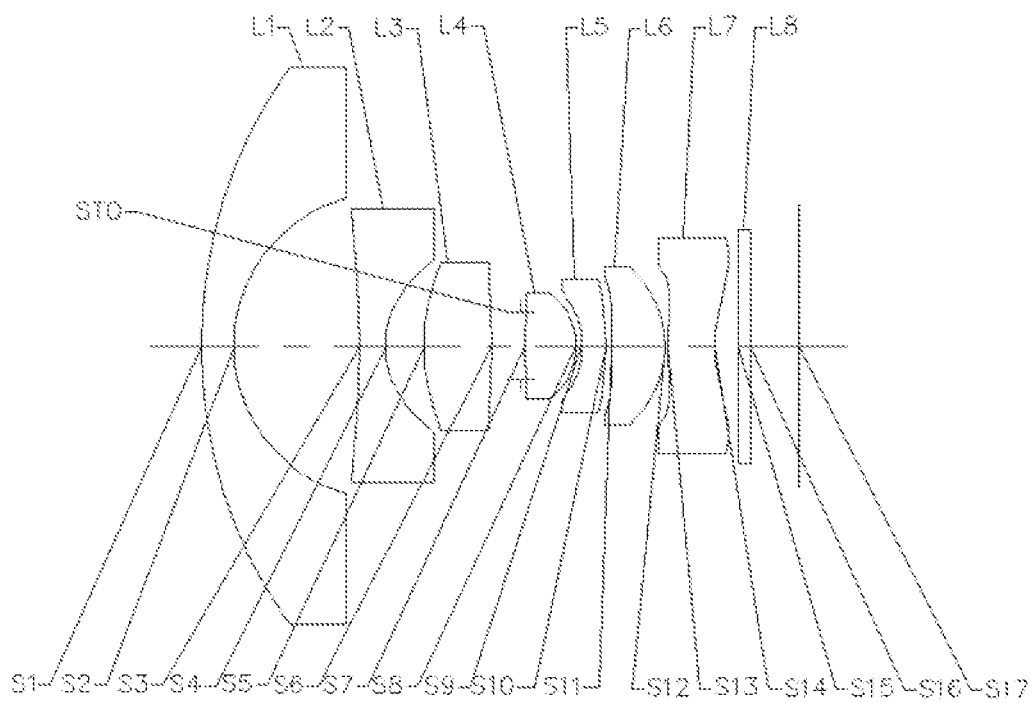
FIG. 29 is the structural schematic diagram of the seven-lens wide-angle camera lens of the eighth embodiment.

The seven-lens wide-angle camera lens of the present embodiment, as shown by FIG. 29, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a negative refractive power, a sixth optical lens L6 that has a positive refractive power and whose image side surface is a convex surface, a seventh optical lens L7 that has a negative refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
|---|---|
| Effective focal length of first optical lens: f1 (mm) | −4.89 |
| Effective focal length of second optical lens: f2 (mm) | −2.65 |
| Effective focal length of third optical lens: f3 (mm) | 3.43 |
| Effective focal length of fourth optical lens: f4 (mm) | 1.85 |
| Effective focal length of fifth optical lens: f5 (mm) | −3.30 |
| Effective focal length of sixth optical lens: f6 (mm) | 3.12 |
| Effective focal length of seventh optical lens: f7 (mm) | −5.54 |
| Effective focal length of seven-piece wide-angle camera lens: f (mm) | 1.22 |
| Stop value: Fno | 2.4 |
| Semiangular field: HFOV (°) | 106 |
| CT3/TTL | 0.11 |
| f6/f7 | −0.56 |
| f4/f | 1.51 |
| ImgH/f | 1.92 |
| ΣT/TTL | 0.35 |
| f1/f | −4.00 |
| CT3/CT6 | 1.27 |
| CT5/CT6 | 0.45 |
| DT31/DT62 | 1.07 | wherein: CT3 is the center thickness of the third optical lens that is on the optical axis; CT5 is the center thickness of the third optical lens that is on the optical axis; CT6 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; DT31 is the effective radius of the object side surface of the third optical lens; and DT62 is the effective radius of the image side surface of the sixth optical lens.

In order to realize the above design parameters, the detailed design that is employed by the seven-lens wide-angle camera lens of the present embodiment can be seen in the following table:

| Surface number | Surface type | Curvature | Thickness | Material | Conic Coefficient |
|---|---|---|---|---|---|
| OBJ | Spheric surface | Infinity | Infinity | | |
| S1 | Spheric surface | 8.0856 | 0.5481 | 1.80/46.6 | |
| S2 | Spheric surface | 2.5728 | 2.1023 | | |
| S3 | Aspheric surface | −17.8121 | 0.4400 | 1.54/56.1 | 0.0000 |
| S4 | Aspheric surface | 1.5916 | 0.6418 | | 0.0000 |
| S5 | Spheric surface | 3.6723 | 1.1318 | 1.85/23.8 | |
| S6 | Spheric surface | −12.4873 | 0.4987 | | |
| STO | Spheric surface | Infinity | 0.0546 | | |
| S7 | Aspheric surface | 3.7451 | 0.8597 | 1.54/56.1 | 0.0000 |
| S8 | Aspheric surface | −1.2726 | 0.1000 | | 0.0000 |
| S9 | Aspheric surface | −1.4185 | 0.4000 | 1.64/23.5 | 0.0000 |
| S10 | Aspheric surface | −4.7185 | 0.1000 | | 0.0000 |
| S11 | Aspheric surface | −107.8296 | 0.8932 | 1.54/56.1 | 0.0000 |
| S12 | Aspheric surface | −1.6835 | 0.0499 | | 0.0000 |
| S13 | Aspheric surface | 5.9318 | 0.7773 | 1.64/23.5 | 0.0000 |
| S14 | Aspheric surface | 2.1176 | 0.3926 | | 0.0000 |
| S15 | Spheric surface | Infinity | 0.2100 | 1.52/64.2 | |
| S16 | Spheric surface | Infinity | 0.8000 | | |
| S17 | Spheric surface | Infinity | | | |

The aspheric high order aberration coefficients (A4, A6, A8, A10 and A12) of the aspheric lens in the seven-lens wide-angle camera lens of the present embodiment can be seen in the following table:

| Surface number | A4 | A6 | A8 | A10 | A12 |
|---|---|---|---|---|---|
| S3 | 3.0390E−03 | −1.2431E−03 | 1.9409E−04 | −7.1175E−06 | 9.0692E−18 |
| S4 | −1.7968E−04 | −3.3271E−03 | −2.6961E−04 | −1.1825E−03 | −5.2948E−14 |
| S7 | −6.1063E−02 | −9.0855E−02 | −9.7610E−02 | −2.4994E−01 | −4.7170E−23 |
| S8 | −6.4202E−02 | −5.8217E−02 | 6.5749E−02 | −1.3184E−01 | 0.0000E+00 |
| S9 | −1.7266E−02 | 1.5343E−02 | −1.0030E−01 | 1.4215E−01 | 2.7912E−23 |
| S10 | 0.0000E+00 | 0.0000E+00 | 0.0000E+00 | 0.0000E+00 | 0.0000E+00 |
| S11 | −6.6781E−02 | 2.4527E−02 | −1.4663E−02 | −5.5175E−04 | 0.0000E+00 |
| S12 | 7.7250E−03 | 0.0000E+00 | 0.0000E+00 | 0.0000E+00 | 0.0000E+00 |
| S13 | −7.4233E−02 | −5.8913E−03 | 4.2335E−04 | −2.9113E−03 | 1.0679E−21 |
| S14 | −8.3651E−02 | 6.3305E−03 | −1.0773E−03 | −6.3040E−05 | 0.0000E+00 |

Figure 30:
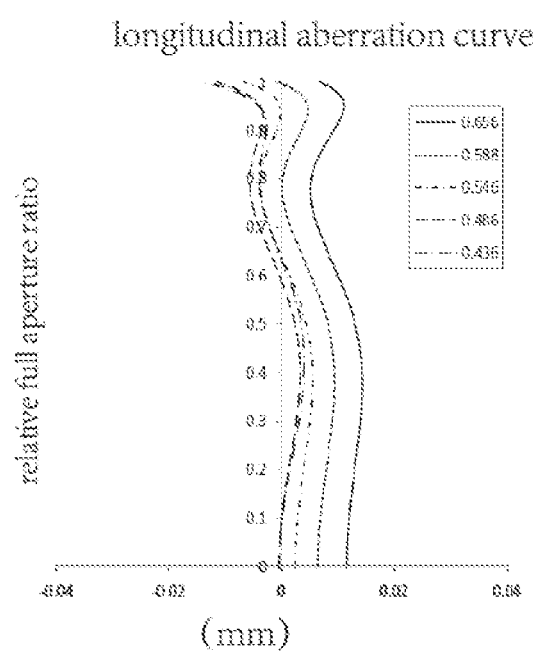
FIG. 30 is the axis chromatic aberration diagram of the seven-lens wide-angle camera lens of the eighth embodiment.
Figure 31:
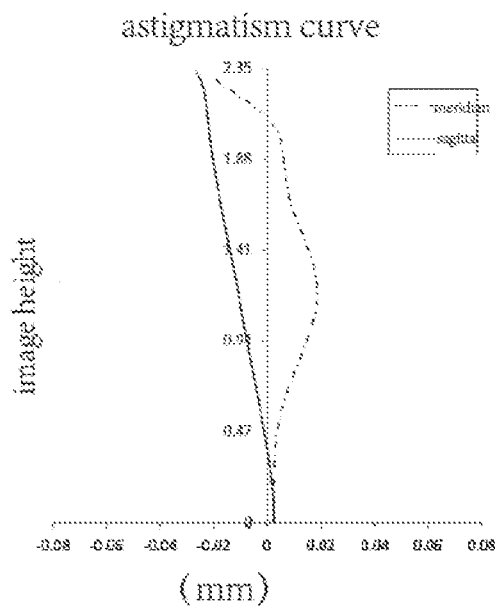
FIG. 31 is the astigmatism diagram of the seven-lens wide-angle camera lens of the eighth embodiment.
Figure 32:
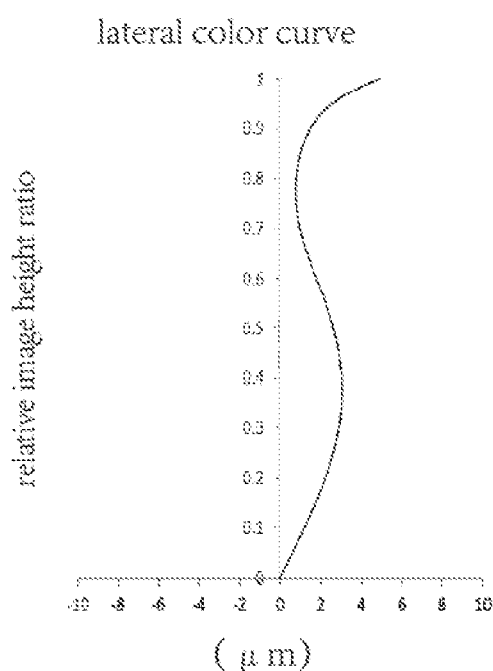
FIG. 32 is the ratio chromatism diagram of the seven-lens wide-angle camera lens of the eighth embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 30, 31 and 32, and maintains good manufacturability while realizing miniaturization.

The Ninth Embodiment

Figure 33:
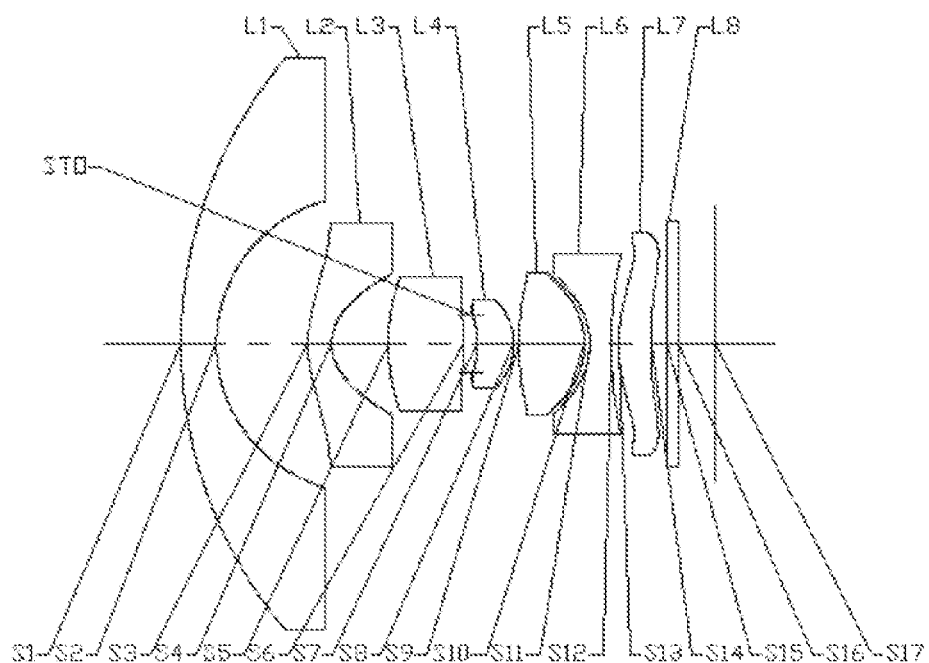
FIG. 33 is the structural schematic diagram of the seven-lens wide-angle camera lens of the ninth embodiment.

The seven-lens wide-angle camera lens of the present embodiment, as shown by FIG. 33, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a positive refractive power and whose image side surface is a convex surface, a sixth optical lens L6 that has a negative refractive power and whose object side surface and image side surface are concave surfaces, a seventh optical lens L7 that has a positive refractive power, and an optical filter L8.

In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
|---|---|
| Effective focal length of first optical lens: f1 (mm) | −5.91 |
| Effective focal length of second optical lens: f2 (mm) | −2.48 |
| Effective focal length of third optical lens: f3 (mm) | 3.29 |
| Effective focal length of fourth optical lens: f4 (mm) | 3.34 |
| Effective focal length of fifth optical lens: f5 (mm) | 2.36 |
| Effective focal length of sixth optical lens: f6 (mm) | −1.81 |
| Effective focal length of seventh optical lens: f7 (mm) | 4.64 |
| Effective focal length of seven-piece wide-angle camera lens: f (mm) | 1.12 |
| Stop value: Fno | 2.40 |
| Total length of optical lenses: TTL (mm) | 10.00 |
| CT3/TTL | 0.14 |
| f6/f7 | −0.39 |
| f4/f | 2.99 |
| ImgH/f | 2.38 |
| ΣT/TTL | 0.34 |
| f3/f5 | 1.40 |
| f5/f7 | 0.51 |
| R10/R11 | 1.03 |
| DT62/DT72 | 0.80 | wherein: CT3 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; R10 is the curvature of the image side surface of the fifth optical lens; R11 is the curvature of the object side surface of the sixth optical lens; DT62 is the effective radius of the image side surface of the sixth optical lens; and DT72 is the effective radius of the image side surface of the seventh optical lens.

In order to realize the above design parameters, the detailed design that is employed by the seven-lens wide-angle camera lens of the present embodiment can be seen in the following table:

| Surface number | Surface type | Curvature | Thickness | Material | Conic Coefficient |
|---|---|---|---|---|---|
| OBJ | Spheric surface | Infinity | Infinity | | |
| S1 | Spheric surface | 8.3128 | 0.6603 | 1.74/44.9 | |
| S2 | Spheric surface | 2.7874 | 1.7142 | | |
| S3 | Aspheric surface | 2.2734 | 0.4400 | 1.54/56.1 | −0.2974 |
| S4 | Aspheric surface | 0.7903 | 1.0658 | | −1.1561 |
| S5 | Spheric surface | 3.6600 | 1.4040 | 1.75/35.0 | |
| S6 | Spheric surface | −6.4358 | 0.1498 | | |
| STO | Spheric surface | Infinity | 0.1092 | | |
| S7 | Aspheric surface | −2.3649 | 0.6881 | 1.54/56.1 | 0.0000 |
| S8 | Aspheric surface | −1.1356 | 0.1000 | | 0.0000 |
| S9 | Aspheric surface | 7.0469 | 1.2227 | 1.54/56.1 | 0.0000 |
| S10 | Aspheric surface | −1.4798 | 0.1000 | | 0.0000 |
| S11 | Aspheric surface | −1.4320 | 0.4000 | 1.64/23.5 | 0.0000 |
| S12 | Aspheric surface | 7.0853 | 0.1398 | | 0.0000 |
| S13 | Aspheric surface | 2.9064 | 0.6260 | 1.54/56.1 | −18.3367 |
| S14 | Aspheric surface | −18.3293 | 0.2701 | | 74.6710 |
| S15 | Spheric surface | Infinity | 0.2100 | 1.52/64.2 | |
| S16 | Spheric surface | Infinity | 0.7000 | | |
| S17 | Spheric surface | Infinity | | | |

The aspheric high order aberration coefficients (A4, A6, A8, A10 and A12) of the aspheric lens in the seven-lens wide-angle camera lens of the present embodiment can be seen in the following table:

| Surface number | A4 | A6 | A8 | A10 | A12 |
|---|---|---|---|---|---|
| S3 | −6.7620E−02 | 1.5971E−02 | −3.9442E−03 | 5.3481E−04 | −3.1695E−05 |
| S4 | 7.5760E−03 | 2.3503E−02 | 7.5363E−03 | −6.8129E−03 | 5.8302E−04 |
| S7 | −1.6811E−01 | −1.6025E−02 | −2.8197E−01 | 6.9850E−02 | −3.2871E−22 |
| S8 | 2.6558E−02 | −4.3933E−02 | 1.1511E−01 | −1.2492E−01 | 5.9505E−19 |
| S9 | 1.9377E−02 | 9.7643E−03 | −7.8186E−03 | −1.3337E−03 | −6.5841E−17 |
| S10 | −2.5439E−02 | 2.2025E−02 | 7.6293E−03 | 8.3725E−04 | 2.0200E−16 |
| S11 | 2.2499E−02 | −1.3528E−02 | −1.3558E−03 | 1.2830E−03 | −9.6904E−17 |
| S12 | −1.1608E−02 | 3.8318E−03 | −8.3965E−06 | −1.0693E−05 | 1.9974E−16 |
| S13 | 5.2863E−02 | −4.3188E−02 | 1.4798E−02 | −2.0487E−03 | 0.0000E+00 |
| S14 | 1.1931E−01 | −6.7674E−02 | 1.8374E−02 | −2.3403E−03 | 7.6551E−05 |

Figure 34:
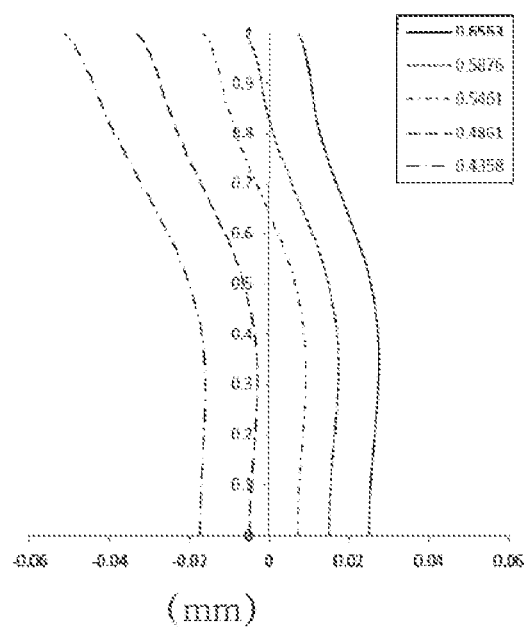
FIG. 34 is the axis chromatic aberration diagram of the seven-lens wide-angle camera lens of the ninth embodiment.
Figure 35:
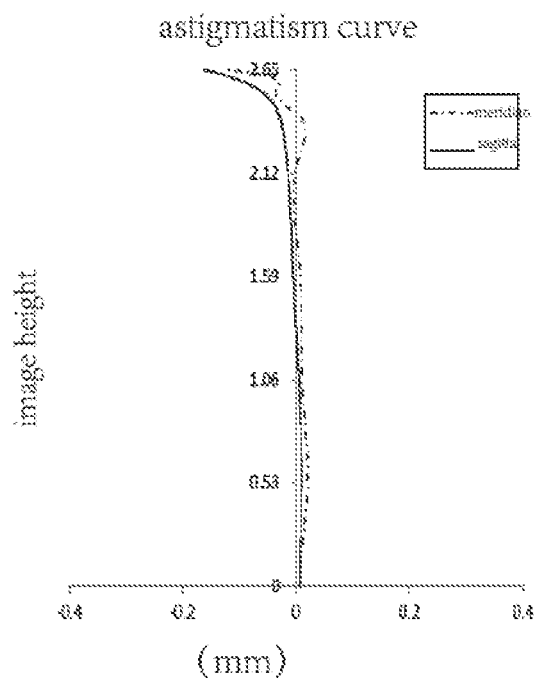
FIG. 35 is the astigmatism diagram of the seven-lens wide-angle camera lens of the ninth embodiment.
Figure 36:
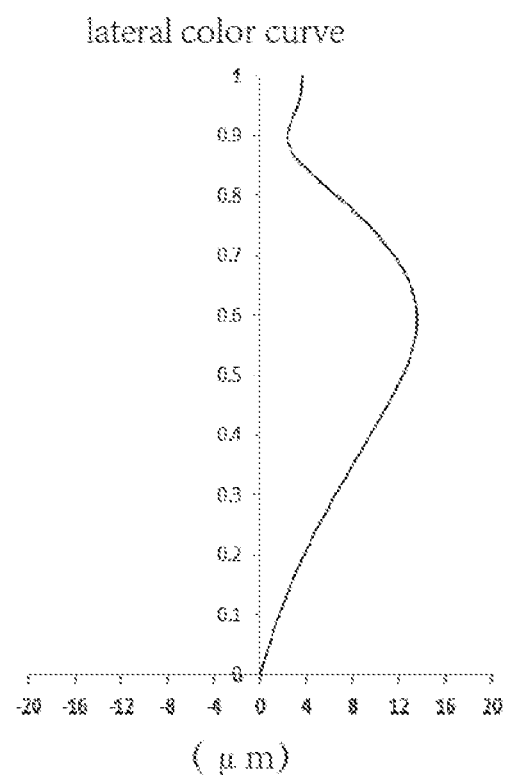
FIG. 36 is the ratio chromatism diagram of the seven-lens wide-angle camera lens of the ninth embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 34, 35 and 36, and maintains good manufacturability while realizing miniaturization.

The Tenth Embodiment

Figure 37:
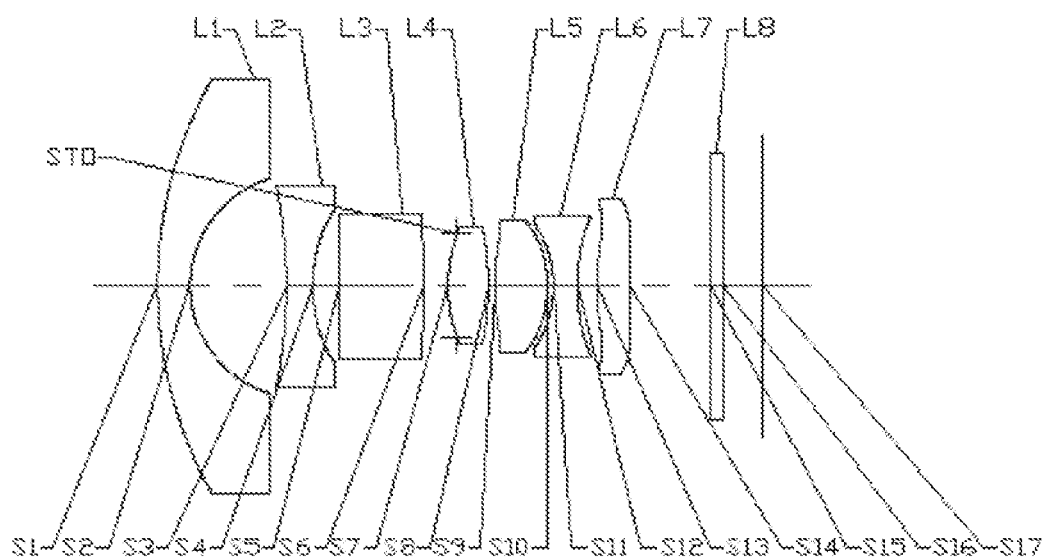
FIG. 37 is the structural schematic diagram of the seven-lens wide-angle camera lens of the tenth embodiment.

The seven-lens wide-angle camera lens of the present embodiment, as shown by FIG. 37, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a positive refractive power and whose image side surface is a convex surface, a sixth optical lens L6 that has a negative refractive power and whose object side surface and image side surface are concave surfaces, a seventh optical lens L7 that has a positive refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
|---|---|
| Effective focal length of first optical lens: f1 (mm) | −3.55 |
| Effective focal length of second optical lens: f2 (mm) | −3.71 |
| Effective focal length of third optical lens: f3 (mm) | 8.28 |
| Effective focal length of fourth optical lens: f4 (mm) | 3.23 |
| Effective focal length of fifth optical lens: f5 (mm) | 2.44 |
| Effective focal length of sixth optical lens: f6 (mm) | −1.92 |
| Effective focal length of seventh optical lens: f7 (mm) | 6.34 |
| Effective focal length of seven-piece wide-angle camera lens: f (mm) | 1.59 |
| Stop value: Fno | 2.46 |
| Total length of optical lenses: TTL (mm) | 10.00 |
| CT3/TTL | 0.14 |
| f6/f7 | −0.30 |
| f4/f | 2.04 |
| ImgH/f | 1.59 |
| ΣT/TTL | 0.29 |
| f3/f5 | 3.39 |

| Name | Numerical value |
|---|---|
| f5/f7 | 0.39 |
| R10/R11 | 1.10 |
| DT62/DT72 | 0.80 | wherein: CT3 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; R10 is the curvature of the image side surface of the fifth optical lens; R11 is the curvature of the object side surface of the sixth optical lens; DT62 is the effective radius of the image side surface of the sixth optical lens; and DT72 is the effective radius of the image side surface of the seventh optical lens.

In order to realize the above design parameters, the detailed design that is employed by the seven-lens wide-angle camera lens of the present embodiment can be seen in the following table:

| Surface number | Surface type | Curvature | Thickness | Material | Conic Coefficient |
|---|---|---|---|---|---|
| OBJ | Spheric surface | Infinity | Infinity | | |
| S1 | Spheric surface | 7.0334 | 0.5389 | 1.74/44.9 | |
| S2 | Spheric surface | 1.8629 | 1.5925 | | |
| S3 | Aspheric surface | −8.3826 | 0.4400 | 1.54/56.1 | 0.0000 |
| S4 | Aspheric surface | 2.7258 | 0.4210 | | 0.0000 |
| S5 | Aspheric surface | 10.6799 | 1.4232 | 1.64/23.5 | 0.0000 |
| S6 | Aspheric surface | −10.1584 | 0.5339 | | 0.0000 |
| STO | Spheric surface | Infinity | −0.1382 | | |
| S7 | Aspheric surface | 2.6445 | 0.6669 | 1.54/56.1 | 0.0000 |
| S8 | Aspheric surface | −4.8352 | 0.1000 | | 0.0000 |
| S9 | Aspheric surface | 3.2307 | 0.8774 | 1.54/56.1 | 0.0000 |
| S10 | Aspheric surface | −2.0546 | 0.1000 | | 0.0000 |
| S11 | Aspheric surface | −1.8732 | 0.4000 | 1.64/23.5 | 0.0000 |
| S12 | Aspheric surface | 3.9739 | 0.3179 | | 0.0000 |
| S13 | Aspheric surface | 3.3194 | 0.5623 | 1.54/56.1 | 0.0000 |
| S14 | Aspheric surface | 75.3681 | 1.3166 | | 0.0000 |
| S15 | Spheric surface | Infinity | 0.2100 | 1.52/64.2 | |
| S16 | Spheric surface | Infinity | 0.6377 | | |
| S17 | Spheric surface | Infinity | | | |

The aspheric high order aberration coefficients (A4, A6, A8 and A10) of the aspheric lens in the seven-lens wide-angle camera lens of the present embodiment can be seen in the following table:

| Surface number | A4 | A6 | A8 | A10 |
|---|---|---|---|---|
| S3 | −3.2310E−03 | 6.7050E−04 | 5.6128E−04 | −1.0205E−04 |
| S4 | 8.1266E−03 | 1.6524E−03 | 1.5293E−03 | 1.7494E−03 |
| S5 | −1.6308E−02 | −3.2047E−03 | 6.5798E−04 | 1.6009E−04 |
| S6 | 7.4877E−03 | −4.9545E−03 | 2.0142E−03 | 4.4028E−04 |
| S7 | 2.5047E−02 | 4.4976E−04 | −1.1755E−02 | 5.5838E−03 |
| S8 | −3.2674E−04 | −2.3904E−03 | −6.9246E−03 | 9.9518E−03 |
| S9 | −2.4581E−02 | −2.1744E−02 | −8.0887E−03 | −9.1766E−05 |
| S10 | −2.6005E−02 | −6.6461E−03 | −2.0606E−03 | −1.9304E−03 |
| S11 | 5.0904E−03 | −3.2212E−03 | 2.1726E−03 | −5.0147E−03 |
| S12 | 2.1067E−02 | 1.1499E−02 | −5.4900E−03 | 0.0000E+00 |
| S13 | −6.1612E−02 | 4.9848E−03 | −7.7106E−03 | 7.1547E−05 |
| S14 | −1.2602E−02 | −1.0542E−02 | −3.5015E−04 | −4.0461E−04 |

Figure 38:
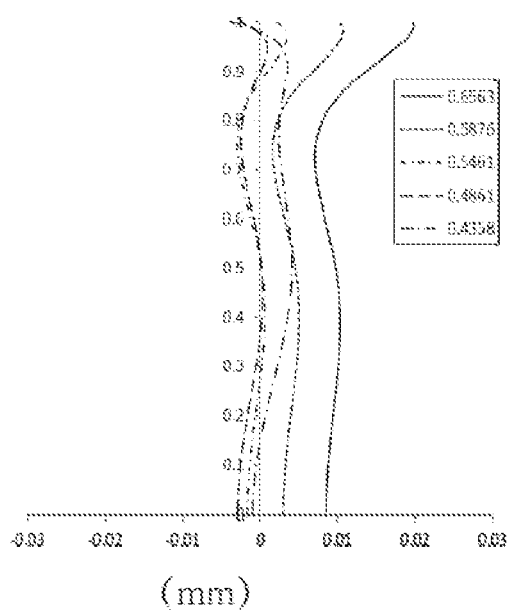
FIG. 38 is the axis chromatic aberration diagram of the seven-lens wide-angle camera lens of the tenth embodiment.
Figure 39:
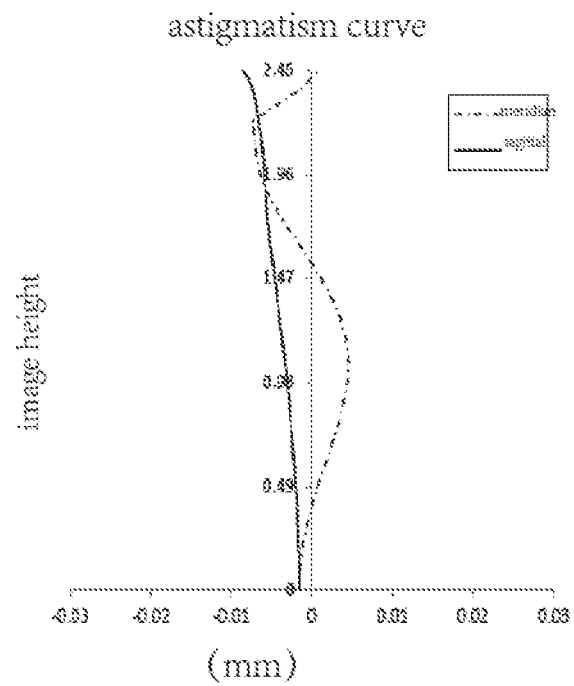
FIG. 39 is the astigmatism diagram of the seven-lens wide-angle camera lens of the tenth embodiment.
Figure 40:
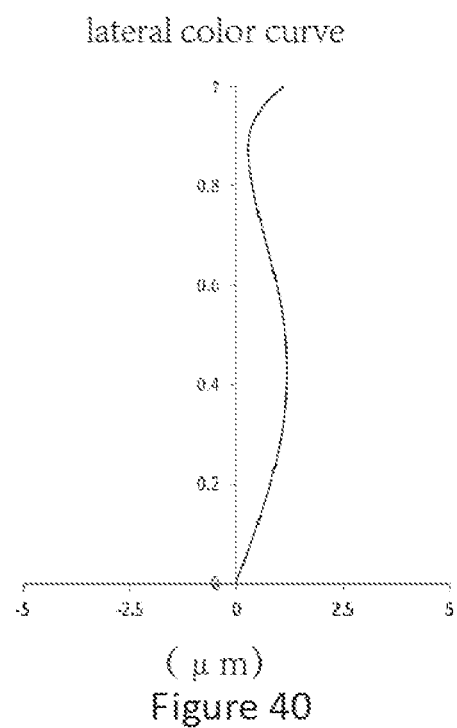
FIG. 40 is the ratio chromatism diagram of the seven-lens wide-angle camera lens of the tenth embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 38, 39 and 40, and maintains good manufacturability while realizing miniaturization.

The Eleventh Embodiment

Figure 41:
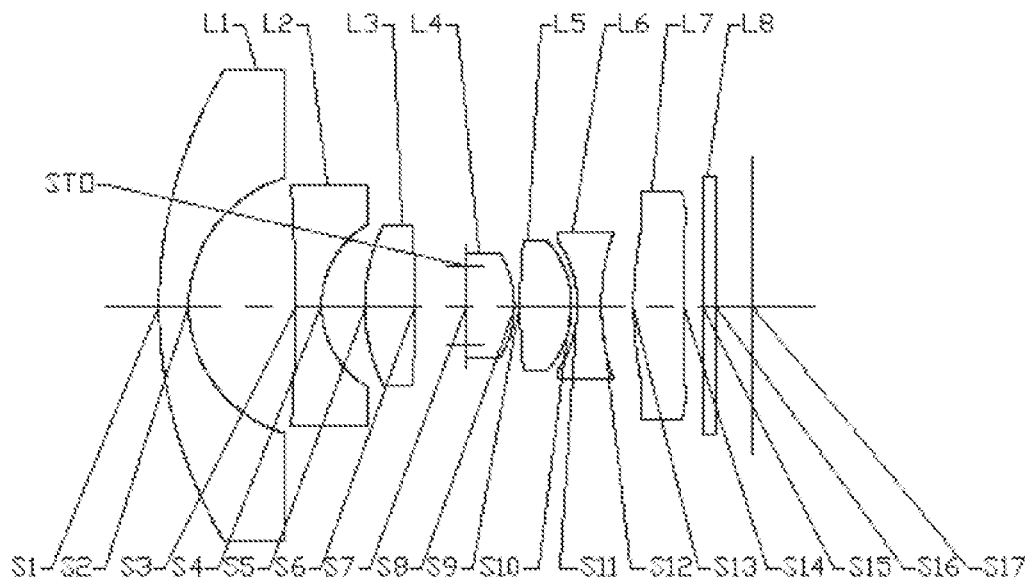
FIG. 41 is the structural schematic diagram of the seven-lens wide-angle camera lens of the eleventh embodiment.

The seven-lens wide-angle camera lens of the present embodiment, as shown by FIG. 41, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a positive refractive power and whose image side surface is a convex surface, a sixth optical lens L6 that has a negative refractive power and whose object side surface and image side surface are concave surfaces, a seventh optical lens L7 that has a positive refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
|---|---|
| Effective focal length of first optical lens: f1 (mm) | −4.40 |
| Effective focal length of second optical lens: f2 (mm) | −2.76 |
| Effective focal length of third optical lens: f3 (mm) | 3.59 |
| Effective focal length of fourth optical lens: f4 (mm) | 2.83 |
| Effective focal length of fifth optical lens: f5 (mm) | 2.73 |
| Effective focal length of sixth optical lens: f6 (mm) | −2.02 |
| Effective focal length of seventh optical lens: f7 (mm) | 8.51 |
| Effective focal length of seven-piece wide-angle camera lens: f (mm) | 1.41 |
| Stop value: Fno | 2.44 |
| Total length of optical lenses: TTL (mm) | 9.99 |
| CT3/TTL | 0.08 |
| f6/f7 | −0.24 |
| f4/f | 2.01 |
| ImgH/f | 1.77 |
| ΣT/TTL | 0.41 |
| f3/f5 | 1.32 |
| f5/f7 | 0.32 |
| R10/R11 | 0.86 |
| DT62/DT72 | 0.64 | wherein: CT3 is the center thickness of the third optical lens that is on the optical axis; TTL is an axial distance from the object side surface of the first optical lens to an imaging plane; ET is the sum of the axial spacing distances of all two adjacent optical lenses of the first optical lens to the seventh optical lens; ImgH is a half of the length of the diagonal line of the effective pixel region on the imaging plane; R10 is the curvature of the image side surface of the fifth optical lens; R11 is the curvature of the object side surface of the sixth optical lens; DT62 is the effective radius of the image side surface of the sixth optical lens; and DT72 is the effective radius of the image side surface of the seventh optical lens.

In order to realize the above design parameters, the detailed design that is employed by the seven-lens wide-angle camera lens of the present embodiment can be seen in the following table:

The aspheric high order aberration coefficients (A4, A6 and A8) of the aspheric lens in the seven-lens wide-angle camera lens of the present embodiment can be seen in the following table:

| Surface number | A4 | A6 | A8 |
|---|---|---|---|
| S7 | −6.2438E−02 | −2.3620E−02 | −1.2223E−02 |
| S12 | 4.3798E−03 | 2.7128E−03 | 5.6002E−04 |
| S13 | −1.1203E−02 | 3.2711E−03 | −2.4002E−03 |
| S14 | 1.6118E−02 | −5.0458E−04 | −1.0949E−03 |

Figure 42:
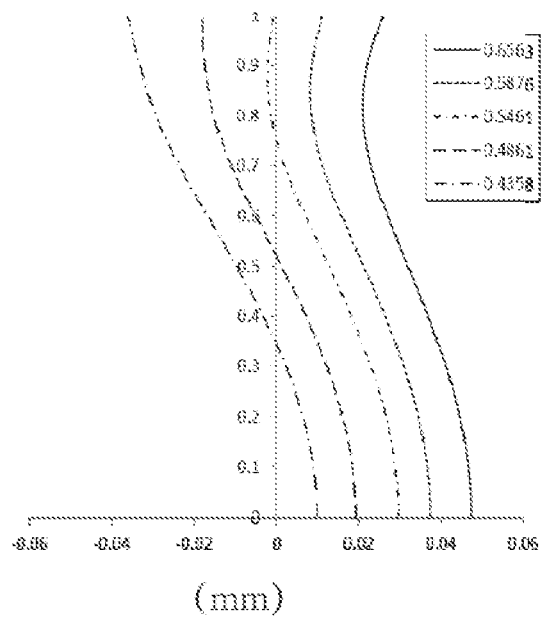
FIG. 42 is the axis chromatic aberration diagram of the seven-lens wide-angle camera lens of the eleventh embodiment.
Figure 43:
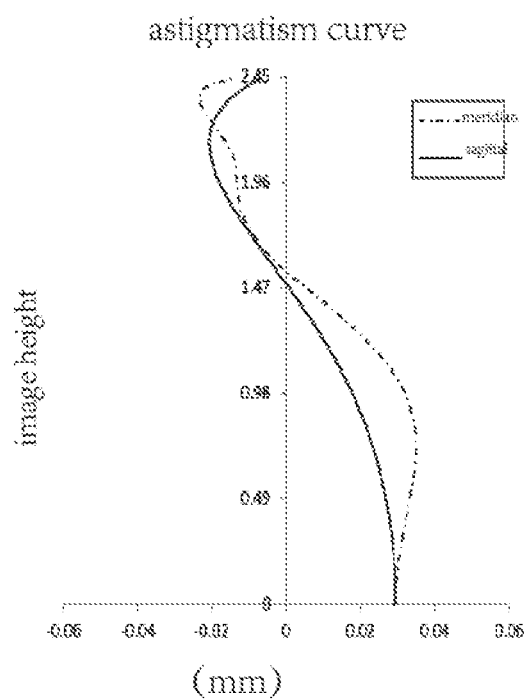
FIG. 43 is the astigmatism diagram of the seven-lens wide-angle camera lens of the eleventh embodiment.
Figure 44:
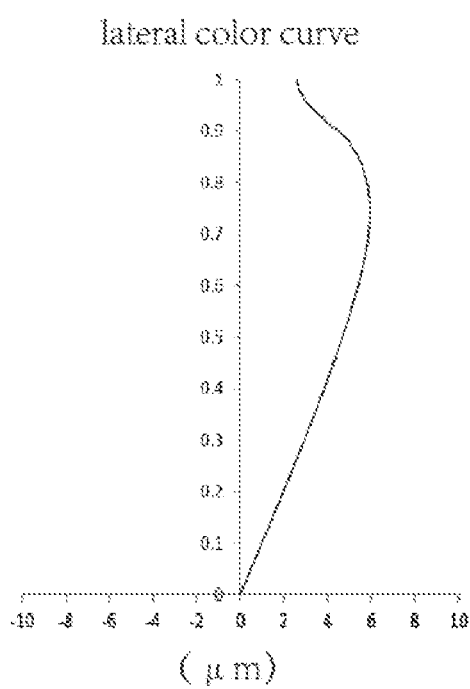
FIG. 44 is the ratio chromatism diagram of the seven-lens wide-angle camera lens of the eleventh embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 42, 43 and 44, and maintains good manufacturability while realizing miniaturization.

The Twelfth Embodiment

Figure 45:
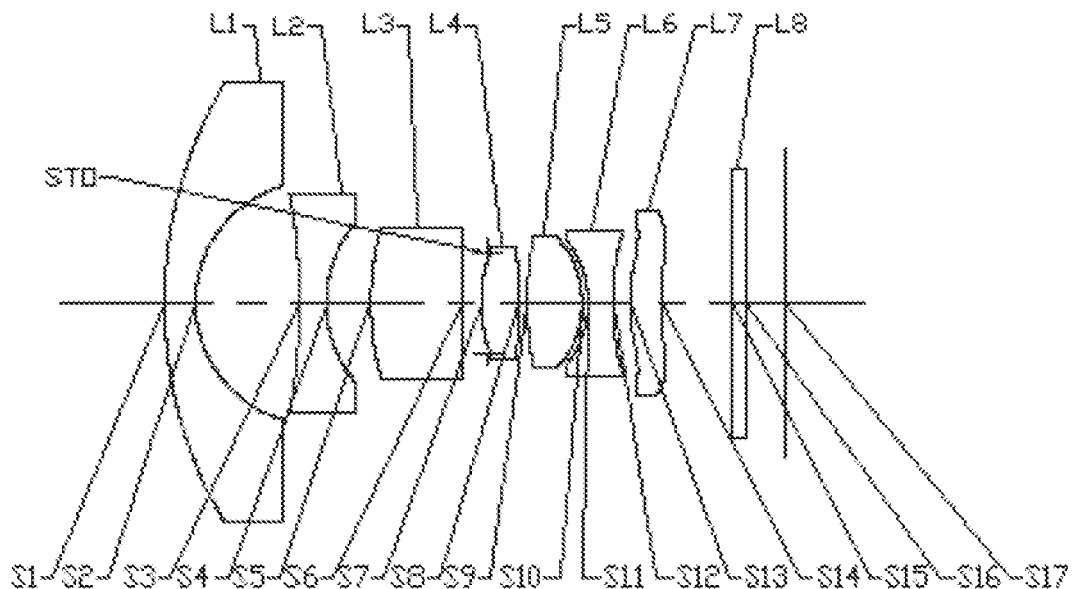
FIG. 45 is the structural schematic diagram of the seven-lens wide-angle camera lens of the twelfth embodiment.

The seven-lens wide-angle camera lens of the present embodiment, as shown by FIG. 45, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a positive refractive power and whose image side surface is a convex surface, a sixth optical lens L6 that has a negative refractive power and whose object side surface and image side surface are concave surfaces, a seventh optical lens L7 that has a positive refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7

| Surface number | Surface type | Curvature | Thickness | Material | Conic Coefficient |
|---|---|---|---|---|---|
| OBJ | Spheric surface | Infinity | Infinity | | |
| S1 | Spheric surface | 7.7395 | 0.5000 | 1.74/44.9 | |
| S2 | Spheric surface | 2.2449 | 1.7918 | | |
| S3 | Spheric surface | −30.6854 | 0.4400 | 1.54/56.1 | |
| S4 | Spheric surface | 1.5947 | 0.7317 | | |
| S5 | Spheric surface | 3.0784 | 0.8419 | 1.75/35.0 | |
| S6 | Spheric surface | −20.1321 | 0.8462 | | |
| STO | Spheric surface | Infinity | 0.0251 | | |
| S7 | Aspheric surface | 10.6288 | 0.8004 | 1.54/56.1 | 0.0000 |
| S8 | Spheric surface | −1.7628 | 0.1000 | | |
| S9 | Spheric surface | 10.8762 | 0.8671 | 1.54/56.1 | |
| S10 | Spheric surface | −1.6800 | 0.1000 | | |
| S11 | Spheric surface | −1.9557 | 0.4000 | 1.64/23.5 | |
| S12 | Aspheric surface | 4.2111 | 0.5390 | | 0.0000 |
| S13 | Aspheric surface | 5.2318 | 0.8549 | 1.54/56.1 | 0.0000 |
| S14 | Aspheric surface | −39.4210 | 0.3142 | | 0.0000 |
| S15 | Spheric surface | Infinity | 0.2100 | 1.52/64.2 | |
| S16 | Spheric surface | Infinity | 0.6321 | | |
| S17 | Spheric surface | Infinity | | | | has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
|---|---|
| Effective focal length of first optical lens: f1 (mm) | −3.84 |
| Effective focal length of second optical lens: f2 (mm) | −3.45 |
| Effective focal length of third optical lens: f3 (mm) | 5.88 |
| Effective focal length of fourth optical lens: f4 (mm) | 3.16 |
| Effective focal length of fifth optical lens: f5 (mm) | 2.31 |
| Effective focal length of sixth optical lens: f6 (mm) | −1.84 |
| Effective focal length of seventh optical lens: f7 (mm) | 7.04 |
| Effective focal length of seven-piece wide-angle camera lens: f (mm) | 1.58 |
| Stop value: Fno | 2.45 |
| Total length of optical lenses: TTL (mm) | 10.00 |
| CT3/TTL | 0.15 |
| f6/f7 | −0.26 |
| f4/f | 2.00 |
| ImgH/f | 1.58 |
| ΣT/TTL | 0.32 |
| f3/f5 | 2.55 |
| f5/f7 | 0.33 |
| R10/R11 | 1.03 |
| DT62/DT72 | 0.78 | wherein: CT3 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; R10 is the curvature of the image side surface of the fifth optical lens; R11 is the curvature of the object side surface of the sixth optical lens; DT62 is the effective radius of the image side surface of the sixth optical lens; and DT72 is the effective radius of the image side surface of the seventh optical lens.

In order to realize the above design parameters, the detailed design that is employed by the seven-lens wide-angle camera lens of the present embodiment can be seen in the following table:

| Surface number | Surface type | Curvature | Thickness | Material | Conic Coefficient |
|---|---|---|---|---|---|
| OBJ | Spheric surface | Infinity | Infinity | | |
| S1 | Spheric surface | 7.0015 | 0.5000 | 1.74/44.9 | |
| S2 | Spheric surface | 1.9743 | 1.6738 | | |
| S3 | Aspheric surface | −16.4484 | 0.4400 | 1.54/56.1 | 0.0000 |
| S4 | Aspheric surface | 2.1492 | 0.7120 | | 0.0000 |
| S5 | Spheric surface | 4.3613 | 1.4956 | 1.75/35.0 | |
| S6 | Spheric surface | 218.4463 | 0.4066 | | |
| STO | Spheric surface | Infinity | −0.1240 | | |
| S7 | Aspheric surface | 2.2828 | 0.6194 | 1.54/56.1 | 0.0000 |
| S8 | Aspheric surface | −6.4408 | 0.1251 | | 0.0000 |
| S9 | Aspheric surface | 4.3134 | 0.8872 | 1.54/56.1 | 0.0000 |
| S10 | Aspheric surface | −1.6510 | 0.1000 | | 0.0000 |
| S11 | Aspheric surface | −1.6057 | 0.4000 | 1.64/23.5 | 0.0000 |
| S12 | Aspheric surface | 5.0209 | 0.2660 | | 0.0000 |
| S13 | Aspheric surface | 2.4815 | 0.5181 | 1.54/56.1 | 0.0000 |
| S14 | Aspheric surface | 6.4762 | 1.1325 | | 0.0000 |
| S15 | Spheric surface | Infinity | 0.2100 | 1.52/64.2 | |
| S16 | Spheric surface | Infinity | 0.6377 | | |
| S17 | Spheric surface | Infinity | | | |

The aspheric high order aberration coefficients (A4, A6, A8 and A10) of the aspheric lens in the seven-lens wide-angle camera lens of the present embodiment can be seen in the following table:

| Surface number | A4 | A6 | A8 | A10 |
|---|---|---|---|---|
| S3 | −1.0536E−02 | 8.5609E−06 | 6.8585E−04 | −8.1087E−05 |
| S4 | 9.0689E−03 | 8.7556E−04 | 1.0958E−04 | 1.6573E−03 |
| S7 | −5.7540E−04 | 6.6430E−03 | −1.2320E−02 | −2.5646E−03 |
| S8 | 1.2046E−03 | −4.2520E−03 | −3.2357E−03 | 9.0518E−03 |
| S9 | −1.6496E−02 | −1.9011E−02 | −6.3217E−03 | 4.0628E−03 |
| S10 | −1.0257E−02 | −4.9647E−04 | −2.3706E−03 | −1.5693E−03 |
| S11 | 2.3555E−03 | −1.6647E−03 | 3.0750E−03 | −3.3691E−03 |
| S12 | 8.1795E−03 | 6.1633E−03 | −3.0578E−04 | 0.0000E+00 |
| S13 | −7.7191E−02 | 9.9319E−03 | −8.5441E−03 | −2.2600E−03 |
| S14 | −1.8931E−02 | −7.4614E−03 | −2.6929E−03 | −2.4927E−04 |

Figure 46:
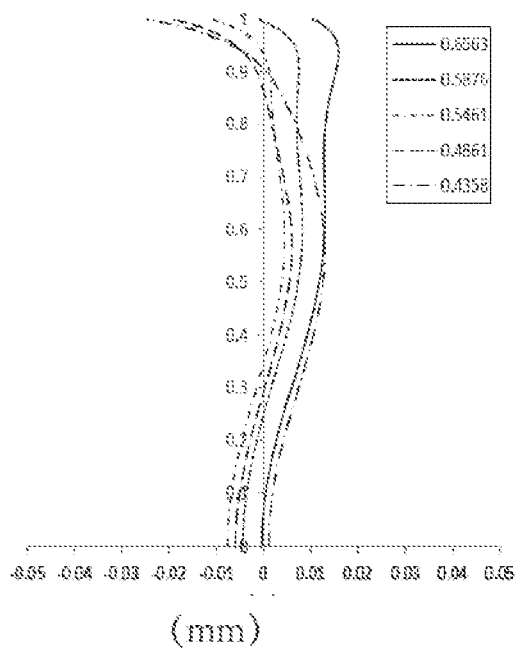
FIG. 46 is the axis chromatic aberration diagram of the seven-lens wide-angle camera lens of the twelfth embodiment.
Figure 47:
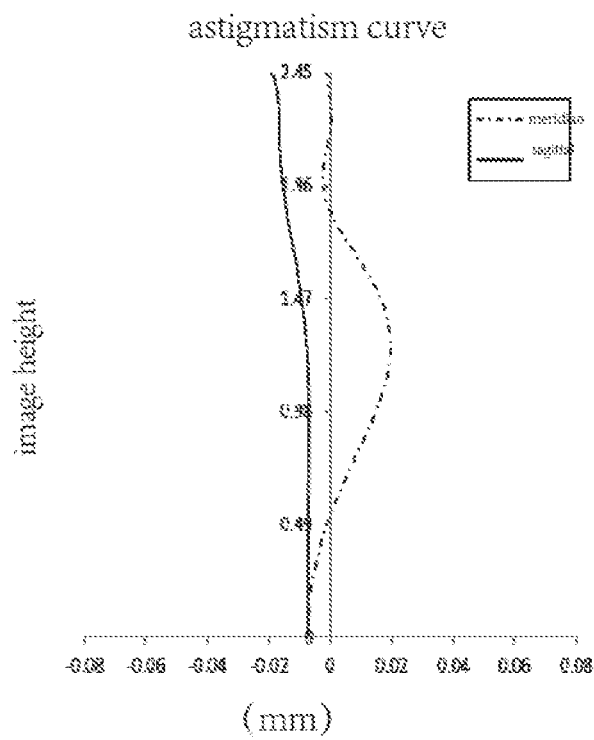
FIG. 47 is the astigmatism diagram of the seven-lens wide-angle camera lens of the twelfth embodiment.
Figure 48:
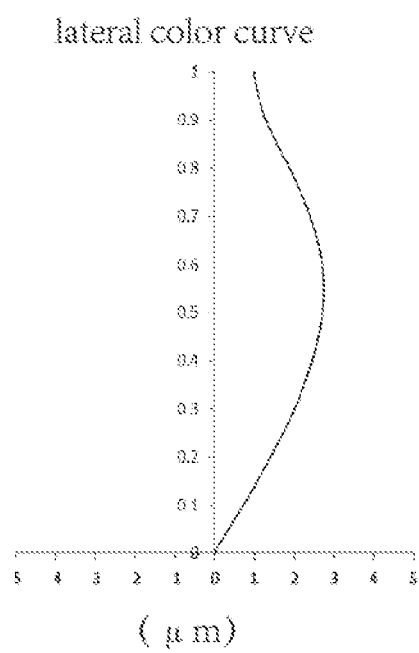
FIG. 48 is the ratio chromatism diagram of the seven-lens wide-angle camera lens of the twelfth embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 46, 47 and 48, and maintains good manufacturability while realizing miniaturization.

The Thirteenth Embodiment

Figure 49:
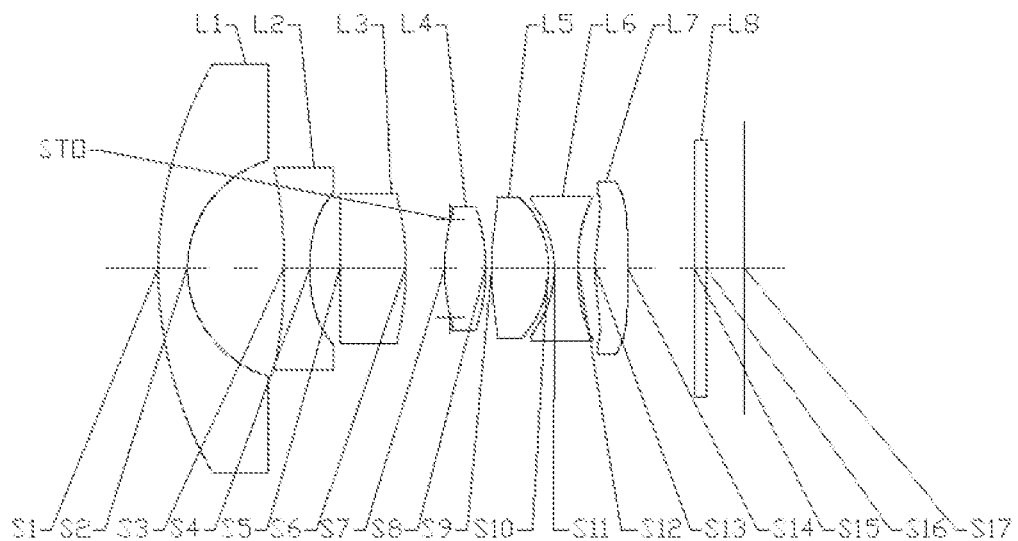
FIG. 49 is the structural schematic diagram of the seven-lens wide-angle camera lens of the thirteenth embodiment.

The seven-lens wide-angle camera lens of the present embodiment, as shown by FIG. 49, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a positive refractive power and whose image side surface is a convex surface, a sixth optical lens L6 that has a negative refractive power and whose object side surface and image side surface are concave surfaces, a seventh optical lens L7 that has a positive refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
|---|---|
| Effective focal length of first optical lens: f1 (mm) | −3.70 |
| Effective focal length of second optical lens: f2 (mm) | −4.55 |
| Effective focal length of third optical lens: f3 (mm) | 6.81 |
| Effective focal length of fourth optical lens: f4 (mm) | 3.26 |
| Effective focal length of fifth optical lens: f5 (mm) | 2.57 |
| Effective focal length of sixth optical lens: f6 (mm) | −1.82 |
| Effective focal length of seventh optical lens: f7 (mm) | 6.88 |
| Effective focal length of seven-piece wide-angle camera lens: f (mm) | 1.63 |
| Stop value: Fno | 2.45 |
| Total length of optical lenses: TTL (mm) | 10.00 |
| CT3/TTL | 0.11 |
| f6/f7 | −0.26 |
| f4/f | 2.00 |
| ImgH/f | 1.53 |
| ΣT/TTL | 0.33 |
| f3/f5 | 2.66 |
| f5/f7 | 0.37 |
| R10/R11 | 1.03 |
| DT62/DT72 | 0.84 | wherein: CT3 is the center thickness of the third optical lens that is on the optical axis; TTL is an axial distance from the object side surface of the first optical lens to the imaging plane; ΣT is the sum of the axial spacing distances of all two adjacent optical lenses of the first optical lens to the seventh optical lens; ImgH is a half of the length of the diagonal line of the effective pixel region on the imaging plane; R10 is the curvature of the image side surface of the fifth optical lens; R11 is the curvature of the object side surface of the sixth optical lens; DT62 is the effective radius of the image side surface of the sixth optical lens; and DT72 is the effective radius of the image side surface of the seventh optical lens.

In order to realize the above design parameters, the detailed design that is employed by the seven-lens wide-angle camera lens of the present embodiment can be seen in the following table:

| Surface number | Surface type | Curvature | Thickness | Material | Conic Coefficient |
|---|---|---|---|---|---|
| OBJ | Spheric surface | Infinity | Infinity | | |
| S1 | Spheric surface | 7.0467 | 0.5000 | 1.74/44.9 | |
| S2 | Spheric surface | 1.9249 | 1.6465 | | |
| S3 | Aspheric surface | −10.9503 | 0.4400 | 1.54/56.1 | 0.0000 |
| S4 | Aspheric surface | 3.2631 | 0.5110 | | 0.0000 |
| S5 | Spheric surface | −203.1182 | 1.1275 | 1.75/35.0 | |
| S6 | Spheric surface | −5.0264 | 0.7571 | | |
| STO | Spheric surface | Infinity | −0.0943 | | |
| S7 | Aspheric surface | 3.3772 | 0.6969 | 1.54/56.1 | 0.0000 |
| S8 | Aspheric surface | −3.4999 | 0.1000 | | 0.0000 |
| S9 | Aspheric surface | 4.6282 | 0.9720 | 1.54/56.1 | 0.0000 |
| S10 | Aspheric surface | −1.8619 | 0.1000 | | 0.0000 |
| S11 | Aspheric surface | −1.8067 | 0.4000 | 1.64/23.5 | 0.0000 |
| S12 | Aspheric surface | 3.6668 | 0.2999 | | 0.0000 |
| S13 | Aspheric surface | 3.7290 | 0.5516 | 1.54/56.1 | 0.0000 |
| S14 | Aspheric surface | 419.0651 | 1.1439 | | 0.0000 |
| S15 | Spheric surface | Infinity | 0.2100 | 1.52/64.2 | |
| S16 | Spheric surface | Infinity | 0.6377 | | |
| S17 | Spheric surface | Infinity | | | |

The aspheric high order aberration coefficients (A4, A6, A8 and A10) of the aspheric lens in the seven-lens wide-angle camera lens of the present embodiment can be seen in the following table:

| Surface number | A4 | A6 | A8 | A10 |
|---|---|---|---|---|
| S3 | −6.7408E−03 | 1.1328E−04 | 5.4444E−04 | −7.2745E−05 |
| S4 | 3.0034E−02 | 7.2145E−03 | 7.3933E−04 | 1.2242E−03 |
| S7 | −4.7566E−03 | 1.3704E−03 | −1.1832E−02 | 2.4540E−03 |
| S8 | −5.6991E−03 | −4.9868E−03 | −3.6362E−03 | 5.3244E−03 |
| S9 | −7.4237E−03 | −1.2698E−02 | −4.1095E−03 | 2.8609E−03 |
| S10 | −1.1569E−02 | −1.2854E−03 | −1.9444E−04 | 4.2217E−04 |
| S11 | 2.3552E−03 | 1.1717E−03 | 4.2384E−03 | −4.1114E−04 |
| S12 | 1.3753E−02 | 5.6347E−03 | −1.3478E−03 | 0.0000E+00 |
| S13 | −5.9632E−02 | 8.3522E−03 | −7.0654E−03 | −4.6793E−04 |
| S14 | −3.0048E−02 | −2.3056E−04 | −2.5514E−03 | −2.7768E−04 |

Figure 50:
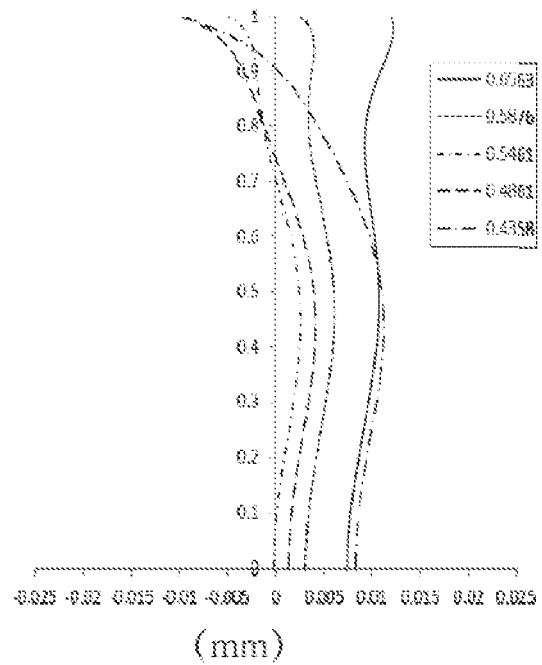
FIG. 50 is the axis chromatic aberration diagram of the seven-lens wide-angle camera lens of the thirteenth embodiment.
Figure 51:
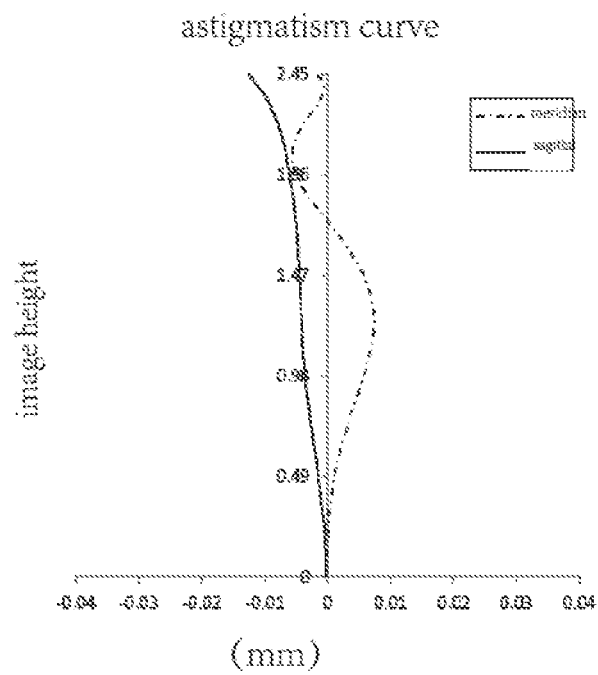
FIG. 51 is the astigmatism diagram of the seven-lens wide-angle camera lens of the thirteenth embodiment.
Figure 52:
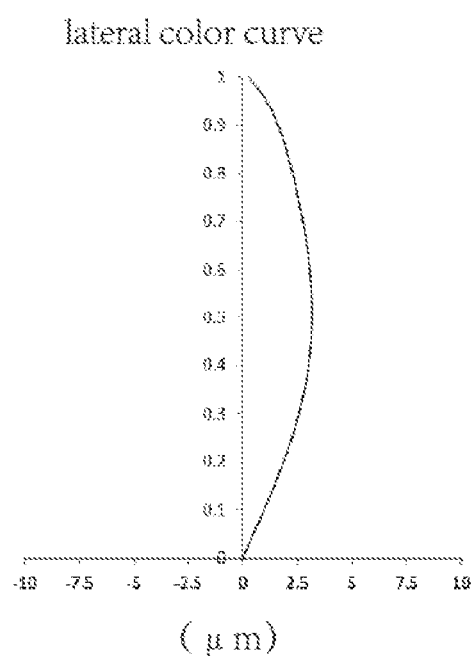
FIG. 52 is the ratio chromatism diagram of the seven-lens wide-angle camera lens of the thirteenth embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 50, 51 and 52, and maintains good manufacturability while realizing miniaturization.

The Fourteenth Embodiment

Figure 53:
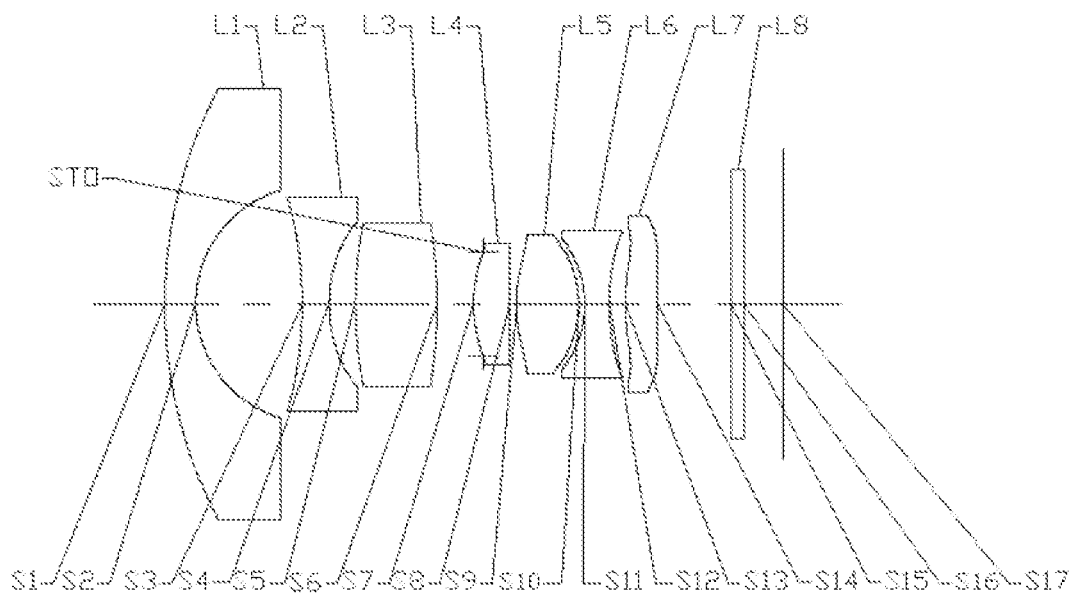
FIG. 53 is the structural schematic diagram of the seven-lens wide-angle camera lens of the fourteenth embodiment.

The seven-lens wide-angle camera lens of the present embodiment, as shown by FIG. 53, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a positive refractive power and whose image side surface is a convex surface, a sixth optical lens L6 that has a negative refractive power and whose object side surface and image side surface are concave surfaces, a seventh optical lens L7 that has a positive refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
|---|---|
| Effective focal length of first optical lens: f1 (mm) | −3.61 |
| Effective focal length of second optical lens: f2 (mm) | −3.35 |
| Effective focal length of third optical lens: f3 (mm) | 4.97 |
| Effective focal length of fourth optical lens: f4 (mm) | 4.69 |
| Effective focal length of fifth optical lens: f5 (mm) | 2.11 |
| Effective focal length of sixth optical lens: f6 (mm) | −1.89 |
| Effective focal length of seventh optical lens: f7 (mm) | 6.67 |
| Effective focal length of seven-piece wide-angle camera lens: f (mm) | 1.59 |
| Stop value: Fno | 2.45 |
| Total length of optical lenses: TTL (mm) | 10.00 |
| CT3/TTL | 0.13 |
| f6/f7 | −0.28 |
| f4/f | 2.96 |
| ImgH/f | 1.53 |
| ΣT/TTL | 0.32 |
| f3/f5 | 2.36 |
| f5/f7 | 0.32 |
| R10/R11 | 1.06 |
| DT62/DT72 | 0.83 | wherein: CT3 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; R10 is the curvature of the image side surface of the fifth optical lens; R11 is the curvature of the object side surface of the sixth optical lens; DT62 is the effective radius of the image side surface of the sixth optical lens; and DT72 is the effective radius of the image side surface of the seventh optical lens.

In order to realize the above design parameters, the detailed design that is employed by the seven-lens wide-angle camera lens of the present embodiment can be seen in the following table:

| Surface number | Surface type | Curvature | Thickness | Material | Conic Coefficient |
|---|---|---|---|---|---|
| OBJ | Spheric surface | Infinity | Infinity | | |
| S1 | Spheric surface | 7.4380 | 0.5000 | 1.74/44.9 | |
| S2 | Spheric surface | 1.9239 | 1.7157 | | |
| S3 | Aspheric surface | −7.8910 | 0.4400 | 1.54/56.1 | 0.0000 |
| S4 | Aspheric surface | 2.4307 | 0.4214 | | 0.0000 |
| S5 | Aspheric surface | 6.5298 | 1.3214 | 1.75/35.0 | 0.0000 |
| S6 | Spheric surface | −8.0407 | 0.7511 | | |
| STO | Spheric surface | Infinity | −0.1597 | | |
| S7 | Aspheric surface | 2.5339 | 0.5904 | 1.54/56.1 | 0.0000 |
| S8 | Aspheric surface | 205.0379 | 0.1000 | | 0.0000 |
| S9 | Aspheric surface | 2.4945 | 1.0029 | 1.54/56.1 | 0.0000 |
| S10 | Aspheric surface | −1.8324 | 0.1000 | | 0.0000 |
| S11 | Aspheric surface | −1.7246 | 0.4000 | 1.64/23.5 | 0.0000 |
| S12 | Aspheric surface | 4.5670 | 0.2553 | | 0.0000 |
| S13 | Aspheric surface | 3.1991 | 0.5160 | 1.54/56.1 | 0.0000 |
| S14 | Aspheric surface | 24.7231 | 1.1979 | | 0.0000 |
| S15 | Spheric surface | Infinity | 0.2100 | 1.52/64.2 | |
| S16 | Spheric surface | Infinity | 0.6377 | | |
| S17 | Spheric surface | Infinity | | | |

The aspheric high order aberration coefficients (A4, A6, A8 and A10) of the aspheric lens in the seven-lens wide-angle camera lens of the present embodiment can be seen in the following table:

| Surface number | A4 | A6 | A8 | A10 |
|---|---|---|---|---|
| S3 | −8.9820E−03 | 6.1594E−05 | 6.6791E−04 | −8.0240E−05 |
| S4 | 7.5706E−03 | 1.4394E−03 | 2.0050E−03 | 8.0442E−04 |
| S5 | −3.7575E−03 | 1.1285E−03 | 9.3146E−04 | 2.1554E−05 |
| S7 | 2.4894E−02 | 3.5378E−03 | −1.3547E−02 | 5.1683E−03 |
| S8 | −2.8944E−03 | −8.7263E−03 | −2.8351E−03 | 1.1471E−02 |
| S9 | −3.0514E−02 | −1.8229E−02 | −7.6565E−03 | 5.9484E−04 |
| S10 | −1.7766E−02 | −5.2816E−03 | −2.7689E−03 | −5.2916E−04 |
| S11 | −2.3304E−03 | −3.7322E−03 | 3.5328E−03 | −2.8656E−03 |
| S12 | 2.3312E−02 | 1.0809E−02 | −5.2253E−03 | 0.0000E+00 |
| S13 | −6.7576E−02 | 3.1849E−03 | −8.2235E−03 | −1.5823E−03 |
| S14 | −2.0066E−02 | −1.0001E−02 | −1.9574E−03 | −4.2839E−04 |

Figure 54:
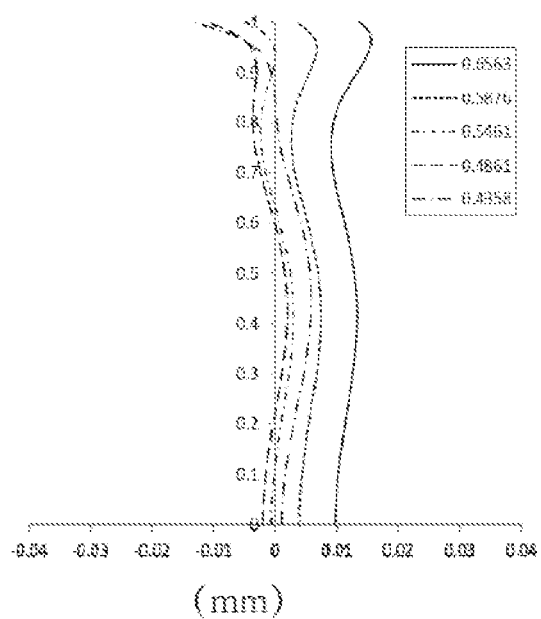
FIG. 54 is the axis chromatic aberration diagram of the seven-lens wide-angle camera lens of the fourteenth embodiment.
Figure 55:
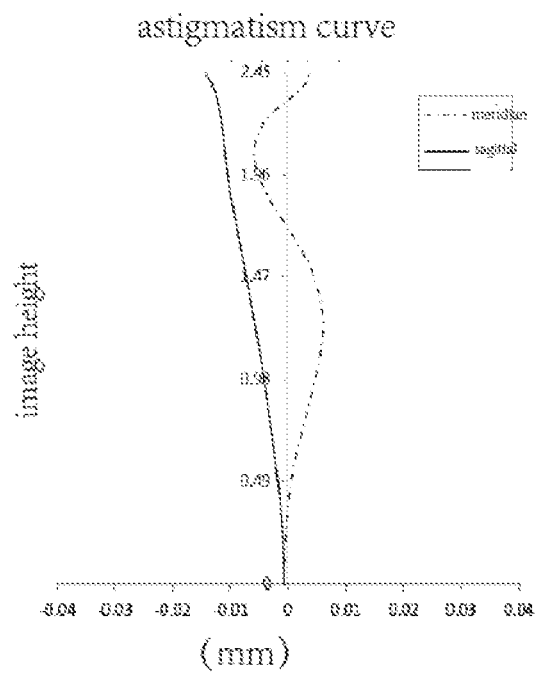
FIG. 55 is the astigmatism diagram of the seven-lens wide-angle camera lens of the fourteenth embodiment.
Figure 56:
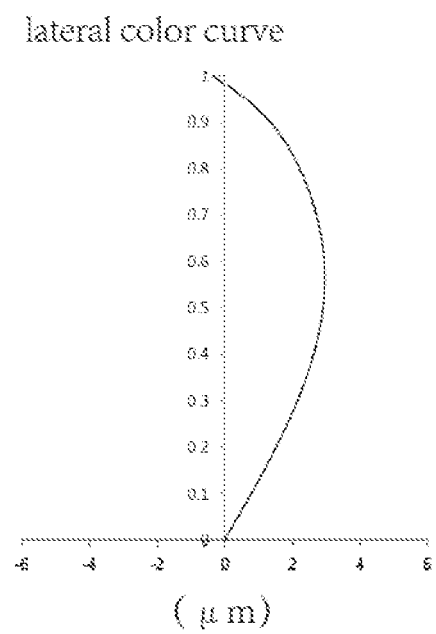
FIG. 56 is the ratio chromatism diagram of the seven-lens wide-angle camera lens of the fourteenth embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 54, 55 and 56, and maintains good manufacturability while realizing miniaturization.

The Fifteenth Embodiment

Figure 57:
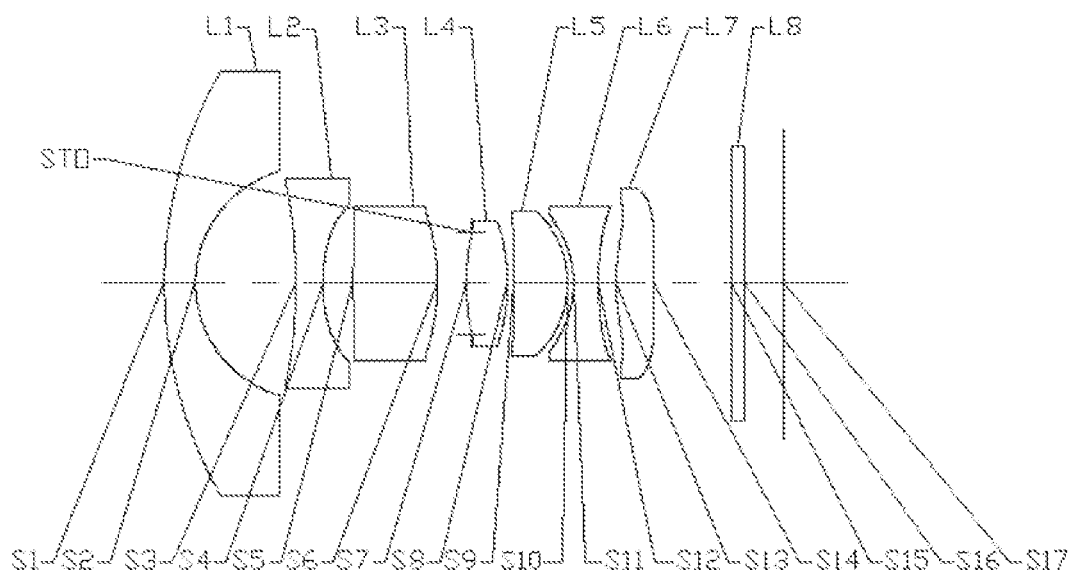
FIG. 57 is the structural schematic diagram of the seven-lens wide-angle camera lens of the fifteenth embodiment.

The seven-lens wide-angle camera lens of the present embodiment, as shown by FIG. 57, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a positive refractive power and whose image side surface is a convex surface, a sixth optical lens L6 that has a negative refractive power and whose object side surface and image side surface are concave surfaces, a seventh optical lens L7 that has a positive refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
|---|---|
| Effective focal length of first optical lens: f1 (mm) | −3.62 |
| Effective focal length of second optical lens: f2 (mm) | −4.17 |
| Effective focal length of third optical lens: f3 (mm) | 4.34 |
| Effective focal length of fourth optical lens: f4 (mm) | 3.30 |
| Effective focal length of fifth optical lens: f5 (mm) | 3.06 |
| Effective focal length of sixth optical lens: f6 (mm) | −1.92 |
| Effective focal length of seventh optical lens: f7 (mm) | 5.80 |
| Effective focal length of seven-piece wide-angle camera lens: f (mm) | 1.65 |
| Stop value: Fno | 2.45 |
| Total length of optical lenses: TTL (mm) | 10.00 |
| CT3/TTL | 0.14 |
| f6/f7 | −0.33 |
| f4/f | 2.00 |
| ImgH/f | 1.52 |
| ΣT/TTL | 0.31 |
| f3/f5 | 1.42 |
| f5/f7 | 0.53 |
| R10/R11 | 0.99 |
| DT62/DT72 | 0.81 | wherein: CT3 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; R10 is the curvature of the image side surface of the fifth optical lens; R11 is the curvature of the object side surface of the sixth optical lens; DT62 is the effective radius of the image side surface of the sixth optical lens; and DT72 is the effective radius of the image side surface of the seventh optical lens.

In order to realize the above design parameters, the detailed design that is employed by the seven-lens wide-angle camera lens of the present embodiment can be seen in the following table:

| Surface number | Surface type | Curvature | Thickness | Material | Conic Coefficient |
|---|---|---|---|---|---|
| OBJ | Spheric surface | Infinity | Infinity | | |
| S1 | Spheric surface | 6.9329 | 0.5000 | 1.74/44.9 | |
| S2 | Spheric surface | 1.8859 | 1.6177 | | |
| S3 | Aspheric surface | −10.8213 | 0.4400 | 1.54/56.1 | 0.0000 |
| S4 | Aspheric surface | 2.9299 | 0.4919 | | 0.0000 |
| S5 | Spheric surface | 33.2084 | 1.3585 | 1.75/35.0 | |
| S6 | Spheric surface | −3.5727 | 0.5383 | | |
| STO | Spheric surface | Infinity | −0.0726 | | |
| S7 | Aspheric surface | 3.5672 | 0.6637 | 1.54/56.1 | 0.0000 |
| S8 | Aspheric surface | −3.3985 | 0.1000 | | 0.0000 |
| S9 | Aspheric surface | −229.2674 | 0.8680 | 1.54/56.1 | 0.0000 |
| S10 | Aspheric surface | −1.6603 | 0.1000 | | 0.0000 |
| S11 | Aspheric surface | −1.6715 | 0.4000 | 1.64/23.5 | 0.0000 |
| S12 | Aspheric surface | 5.2744 | 0.2844 | | 0.0000 |
| S13 | Aspheric surface | 3.0100 | 0.6158 | 1.54/56.1 | 0.0000 |
| S14 | Aspheric surface | 55.1328 | 1.2464 | | 0.0000 |
| S15 | Spheric surface | Infinity | 0.2100 | 1.52/64.2 | |
| S16 | Spheric surface | Infinity | 0.6377 | | |
| S17 | Spheric surface | Infinity | | | |

The aspheric high order aberration coefficients (A4, A6, A8 and A10) of the aspheric lens in the seven-lens wide-angle camera lens of the present embodiment can be seen in the following table:

| Surface number | A4 | A6 | A8 | A10 |
|---|---|---|---|---|
| S1 | −7.6617E−03 | −1.0010E−04 | 6.3148E−04 | −7.2145E−05 |
| S2 | 3.3731E−02 | 8.0195E−03 | 1.2328E−03 | 7.6222E−04 |
| S3 | −1.4733E−02 | 2.8688E−03 | −1.3024E−02 | 3.0761E−03 |
| S4 | −1.1862E−02 | −4.0081E−03 | −7.7380E−04 | 9.2530E−03 |
| S5 | −2.3188E−03 | −1.6357E−02 | −5.5920E−03 | 5.7713E−03 |
| S6 | −1.2326E−02 | −3.9672E−04 | 3.9918E−04 | 1.0240E−04 |
| S7 | 7.8953E−03 | 3.8740E−03 | 5.5416E−03 | 9.0095E−04 |
| S8 | 1.2844E−02 | 6.3383E−03 | −8.3383E−04 | 0.0000E+00 |
| S9 | −6.4809E−02 | 1.0629E−02 | −7.2705E−03 | −1.0097E−03 |
| S10 | −2.6490E−02 | −1.1984E−03 | −2.3255E−03 | −5.0556E−04 |

Figure 58:
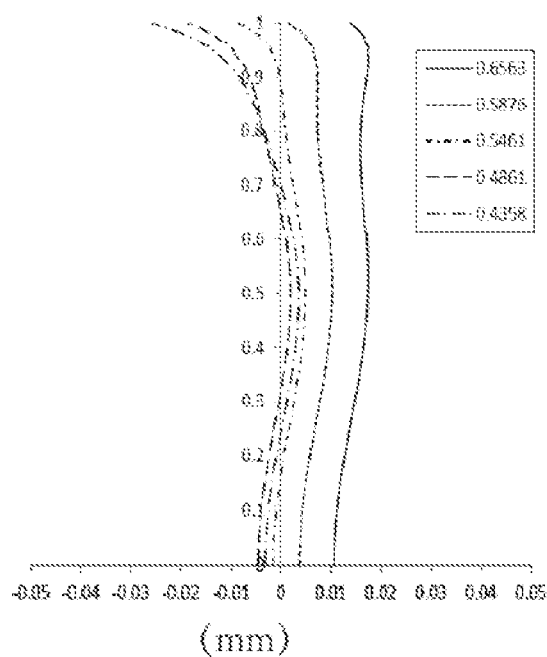
FIG. 58 is the axis chromatic aberration diagram of the seven-lens wide-angle camera lens of the fifteenth embodiment.
Figure 59:
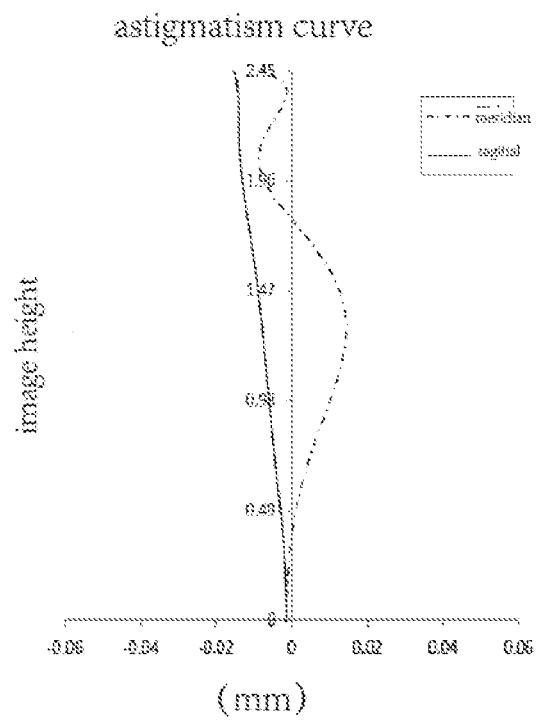
FIG. 59 is the astigmatism diagram of the seven-lens wide-angle camera lens of the fifteenth embodiment.
Figure 60:
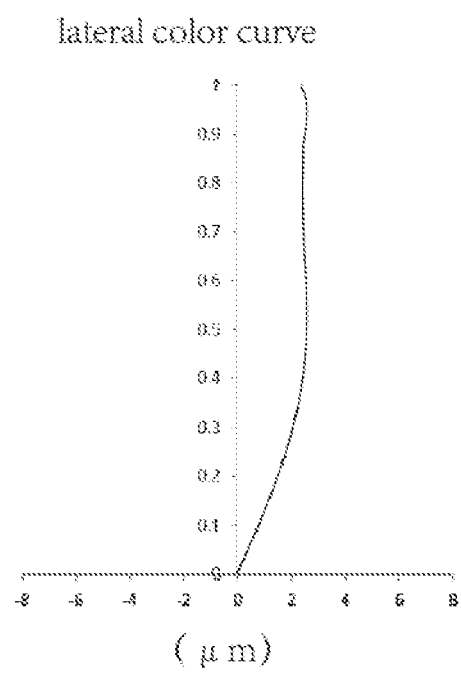
FIG. 60 is the ratio chromatism diagram of the seven-lens wide-angle camera lens of the fifteenth embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 58, 59 and 60, and maintains good manufacturability while realizing miniaturization.

The Sixteenth Embodiment

Figure 61:
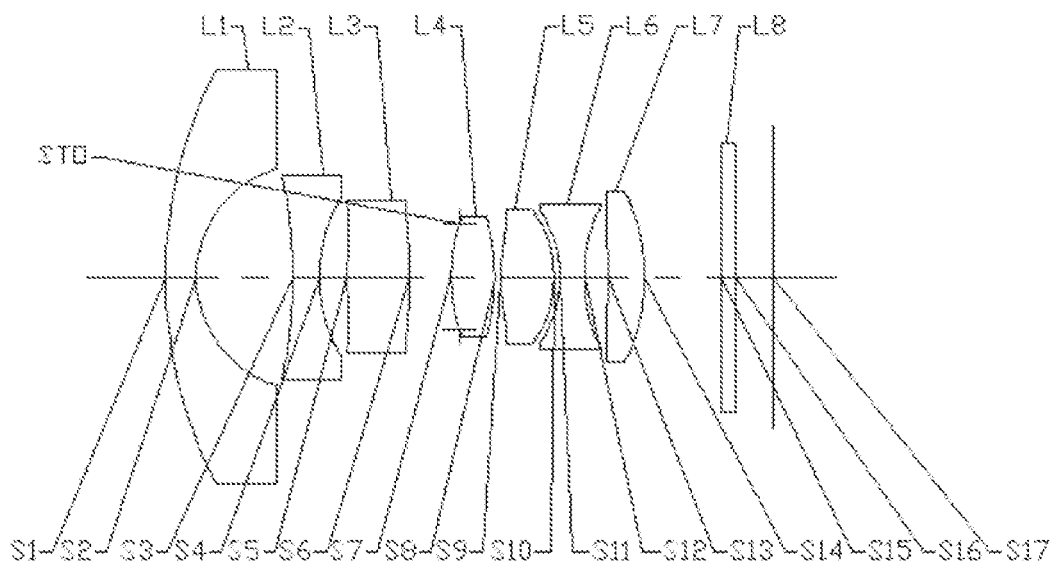
FIG. 61 is the structural schematic diagram of the seven-lens wide-angle camera lens of the sixteenth embodiment.

The seven-lens wide-angle camera lens of the present embodiment, as shown by FIG. 61, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a positive refractive power and whose image side surface is a convex surface, a sixth optical lens L6 that has a negative refractive power and whose object side surface and image side surface are concave surfaces, a seventh optical lens L7 that has a positive refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
| --- | --- |
| Effective focal length of first optical lens: f1 (mm) | −3.43 |
| Effective focal length of second optical lens: f2 (mm) | −3.73 |
| Effective focal length of third optical lens: f3 (mm) | 7.29 |
| Effective focal length of fourth optical lens: f4 (mm) | 3.13 |
| Effective focal length of fifth optical lens: f5 (mm) | 2.45 |
| Effective focal length of sixth optical lens: f6 (mm) | −1.83 |
| Effective focal length of seventh optical lens: f7 (mm) | 6.48 |
| Effective focal length of seven-piece wide-angle camera lens: f (mm) | 1.57 |
| Stop value: Fno | 2.45 |
| Total length of optical lenses: TTL (mm) | 10.00 |
| CT3/TTL | 0.10 |
| f6/f7 | −0.28 |
| f4/f | 2.00 |
| ImgH/f | 1.60 |
| ΣT/TTL | 0.33 |
| f3/f5 | 2.97 |
| f5/f7 | 0.38 |
| R10/R11 | 1.05 |
| DT62/DT72 | 0.85 | wherein: CT3 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; R10 is the curvature of the image side surface of the fifth optical lens; R11 is the curvature of the object side surface of the sixth optical lens; DT62 is the effective radius of the image side surface of the sixth optical lens; and DT72 is the effective radius of the image side surface of the seventh optical lens.

In order to realize the above design parameters, the detailed design that is employed by the seven-lens wide-angle camera lens of the present embodiment can be seen in the following table:

| Surface number | Surface type | Curvature | Thickness | Material | Conic Coefficient |
| --- | --- | --- | --- | --- | --- |
| OBJ | Spheric surface | Infinity | Infinity | | |
| S1 | Spheric surface | 7.4846 | 0.5000 | 1.74/44.9 | |
| S2 | Spheric surface | 1.8572 | 1.5923 | | |
| S3 | Aspheric surface | −7.6231 | 0.4400 | 1.54/56.1 | 0.0000 |
| S4 | Aspheric surface | 2.8363 | 0.4573 | | 0.0000 |
| S5 | Aspheric surface | 12.3213 | 1.0267 | 1.64/23.5 | 0.0000 |
| S6 | Aspheric surface | −7.3680 | 0.8203 | | 0.0000 |
| STO | Spheric surface | Infinity | −0.1368 | | |
| S7 | Aspheric surface | 3.4114 | 0.7104 | 1.54/56.1 | 0.0000 |
| S8 | Aspheric surface | −3.1833 | 0.1000 | | 0.0000 |
| S9 | Aspheric surface | 3.1497 | 0.8731 | 1.54/56.1 | 0.0000 |
| S10 | Aspheric surface | −2.1049 | 0.1000 | | 0.0000 |
| S11 | Aspheric surface | −2.0014 | 0.4000 | 1.64/23.5 | 0.0000 |
| S12 | Aspheric surface | 3.1012 | 0.3836 | | 0.0000 |
| S13 | Aspheric surface | −209.4732 | 0.6035 | 1.54/56.1 | 0.0000 |
| S14 | Aspheric surface | −3.4834 | 1.2818 | | 0.0000 |
| S15 | Spheric surface | Infinity | 0.2100 | 1.52/64.2 | |
| S16 | Spheric surface | Infinity | 0.6377 | | |
| S17 | Spheric surface | Infinity | | | |

The aspheric high order aberration coefficients (A4, A6, A8 and A10) of the aspheric lens in the seven-lens wide-angle camera lens of the present embodiment can be seen in the following table:

| Surface number | A4 | A6 | A8 | A10 |
| --- | --- | --- | --- | --- |
| S3 | −4.5442E−04 | 6.5142E−04 | 4.4402E−04 | −1.0332E−04 |
| S4 | 5.5350E−03 | 1.1110E−03 | 8.4214E−04 | 1.4678E−03 |
| S5 | −2.0801E−02 | −6.0236E−03 | −2.5454E−04 | 3.7697E−05 |
| S6 | 1.0650E−02 | −5.5330E−03 | 1.3499E−03 | 4.2499E−04 |
| S7 | 3.5157E−02 | 1.4636E−03 | −1.1034E−02 | 6.8835E−03 |
| S8 | 6.8506E−03 | 2.3705E−03 | −6.2376E−03 | 9.1732E−03 |
| S9 | −2.9502E−02 | −2.2143E−02 | −8.6017E−03 | 5.5818E−04 |
| S10 | −1.6844E−02 | −8.9080E−03 | −1.9527E−03 | −1.3756E−03 |
| S11 | 2.7580E−04 | 3.8593E−03 | 2.3698E−03 | −6.8156E−03 |
| S12 | 2.4130E−02 | 8.6788E−03 | −6.1237E−03 | 0.0000E+00 |
| S13 | −2.1774E−02 | 7.4492E−03 | −4.9659E−03 | 3.1457E−03 |
| S14 | −3.7333E−03 | −3.0994E−03 | 1.1492E−03 | −4.1424E−04 |

Figure 62:
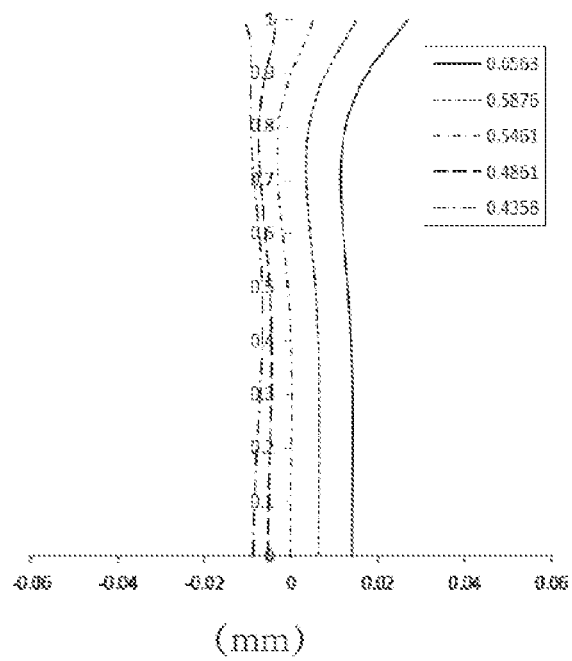
FIG. 62 is the axis chromatic aberration diagram of the seven-lens wide-angle camera lens of the sixteenth embodiment.
Figure 63:
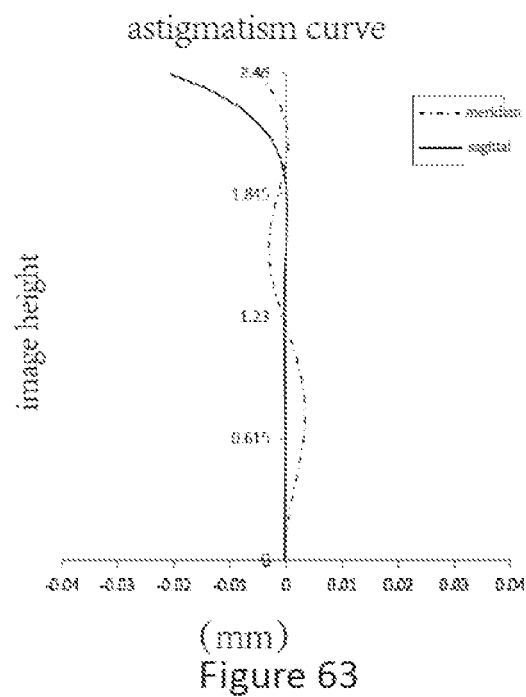
FIG. 63 is the astigmatism diagram of the seven-lens wide-angle camera lens of the sixteenth embodiment.
Figure 64:
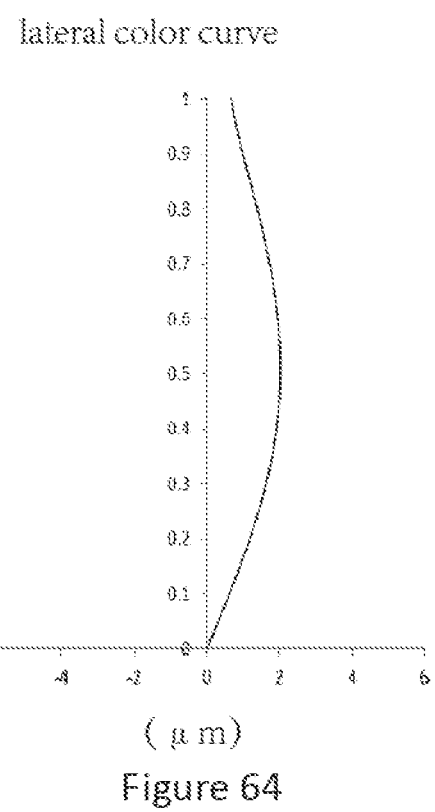
FIG. 64 is the ratio chromatism diagram of the seven-lens wide-angle camera lens of the sixteenth embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 62, 63 and 64, and maintains good manufacturability while realizing miniaturization.

The Seventeenth Embodiment

Figure 65:
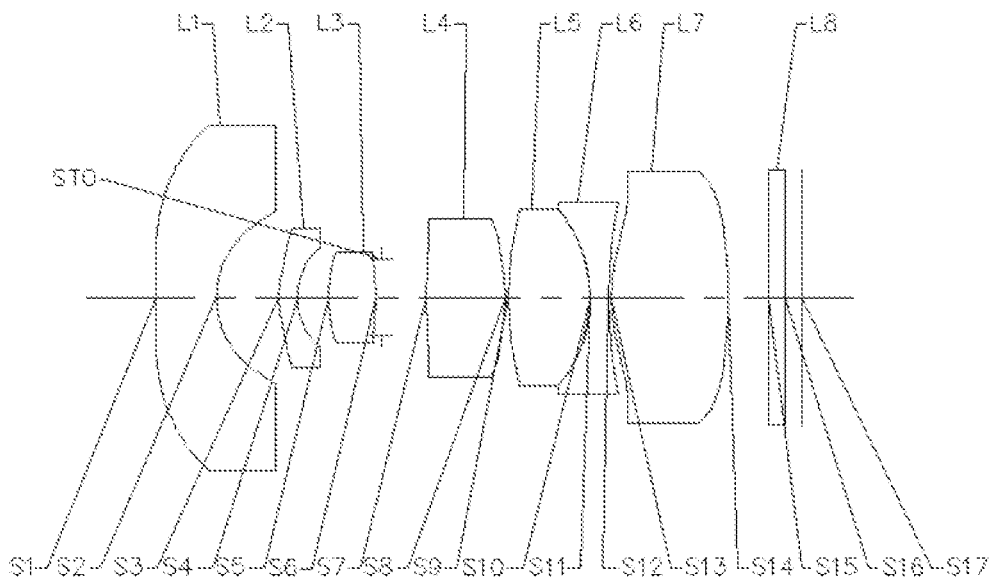
FIG. 65 is the structural schematic diagram of the seven-lens wide-angle camera lens of the seventeenth embodiment.

The seven-lens wide-angle camera lens of the present embodiment, as shown by FIG. 65, comprises, along the optical axis successively from the object side to the image side: a first optical lens L1 that has a negative refractive power, a second optical lens L2 that has a negative refractive power, a third optical lens L3 that has a positive refractive power, a fourth optical lens L4 that has a positive refractive power, a fifth optical lens L5 that has a positive refractive power and whose image side surface is a convex surface, a sixth optical lens L6 that has a negative refractive power and whose object side surface and image side surface are concave surfaces, a seventh optical lens L7 that has a positive refractive power, and an optical filter L8. In that: the first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the optical filter L8 has an object side surface S15 and an image side surface S16. The imaging plane S17 of the seven-lens wide-angle camera lens of the present embodiment is located at the image side of the optical filter L8, and can be used to install a photosensitive element.

The main design parameters of the seven-lens wide-angle camera lens of the present embodiment can be seen in the following table:

| Name | Numerical value |
|---|---|
| Effective focal length of first optical lens: f1 (mm) | −4.93 |
| Effective focal length of second optical lens: f2 (mm) | −12.68 |
| Effective focal length of third optical lens: f3 (mm) | 7.54 |
| Effective focal length of fourth optical lens: f4 (mm) | 7.59 |
| Effective focal length of fifth optical lens: f5 (mm) | 4.88 |
| Effective focal length of sixth optical lens: f6 (mm) | −3.76 |
| Effective focal length of seventh optical lens: f7 (mm) | 8.52 |
| Effective focal length of seven-piece wide-angle camera lens: f (mm) | 3.02 |
| Stop value: Fno | 2.50 |
| Total length of optical lenses: TTL (mm) | 21.01 |
| CT3/TTL | 0.07 |
| f6/f7 | −0.44 |
| f4/f | 2.51 |
| ImgH/f | 1.38 |
| ΣT/TTL | 0.23 |
| f3/f5 | 1.55 |
| f5/f7 | 0.57 |
| R10/R11 | 1.00 |
| DT62/DT72 | 0.77 | wherein: CT3 is the center thickness of the third optical lens that is on the optical axis; TTL is an axial distance from the object side surface of the first optical lens to an imaging plane; ΣT is the sum of the axial spacing distances of all two adjacent optical lenses of the first optical lens to the seventh optical lens; ImgH is a half of the length of the diagonal line of the effective pixel region on the imaging plane; R10 is the curvature of the image side surface of the fifth optical lens; R11 is the curvature of the object side surface of the sixth optical lens; DT62 is the effective radius of the image side surface of the sixth optical lens; and DT72 is the effective radius of the image side surface of the seventh optical lens.

In order to realize the above design parameters, the detailed design that is employed by the seven-lens wide-angle camera lens of the present embodiment can be seen in the following table:

| Surface number | Surface type | Curvature | Thickness | Material | Conic Coefficient |
|---|---|---|---|---|---|
| OBJ | Spheric surface | Infinity | Infinity | | |
| S1 | Aspheric surface | −33.7136 | 1.9758 | 1.53/55.8 | 0.0000 |
| S2 | Aspheric surface | 2.9346 | 2.0280 | | 0.0000 |
| S3 | Aspheric surface | 2.9199 | 0.6000 | 1.53/55.8 | 0.0000 |
| S4 | Aspheric surface | 1.8969 | 1.0224 | | 0.0000 |
| S5 | Aspheric surface | 6.1526 | 1.5161 | 1.53/55.8 | 0.0000 |
| S6 | Aspheric surface | −10.8301 | 0.2103 | | 0.0000 |
| STO | Spheric surface | Infinity | 1.4495 | | |
| S7 | Spheric surface | 26.5937 | 2.5549 | 1.83/42.7 | |
| S8 | Spheric surface | −8.0000 | 0.1000 | | |
| S9 | Spheric surface | 11.2147 | 2.6572 | 1.71/53.9 | |
| S10 | Spheric surface | −4.5720 | 0.0050 | | |
| S11 | Spheric surface | −4.5720 | 0.6000 | 1.92/20.9 | |
| S12 | Spheric surface | 15.8786 | 0.1000 | | |
| S13 | Aspheric surface | 5.7772 | 3.7839 | 1.53/55.8 | 0.0000 |
| S14 | Aspheric surface | −16.9531 | 1.3120 | | 0.0000 |
| S15 | Spheric surface | Infinity | 0.5500 | 1.52/64.2 | |
| S16 | Spheric surface | Infinity | 0.5400 | | |
| S17 | Spheric surface | Infinity | | | |

The aspheric high order aberration coefficients (A4, A6, A8, A10, A12, A14 and A16) of the aspheric lens in the seven-lens wide-angle camera lens of the present embodiment can be seen in the following table:

| Surface number | A4 | A6 | A8 | A10 | A12 | A14 | A16 |
|---|---|---|---|---|---|---|---|
| S1 | 7.2830E−03 | −6.6609E−04 | 4.8964E−05 | −2.3872E−06 | 7.3147E−08 | −1.2613E−09 | 9.2387E−12 |
| S2 | 1.7413E−03 | 3.4767E−03 | −2.5180E−03 | 8.2725E−04 | −1.5173E−04 | 1.4871E−05 | −6.1167E−07 |
| S3 | −4.4914E−02 | −2.7555E−02 | −2.1377E−03 | 6.2362E−03 | 3.8052E−04 | −3.8197E−05 | 1.6841E−06 |
| S4 | −5.2647E−02 | 4.4934E−05 | 9.9453E−03 | −2.9907E−03 | −1.0371E−04 | 3.3933E−04 | −6.0957E−05 |
| S5 | 6.3506E−03 | −1.0330E−05 | 4.3591E−03 | −1.9885E−03 | 6.0891E−04 | −7.6680E−05 | 2.4869E−06 |
| S6 | 4.4009E−03 | −1.9665E−02 | 4.5770E−02 | −5.4940E−02 | 3.7095E−02 | −1.2997E−02 | 1.8620E−03 |
| S13 | −3.9213E−03 | −2.3133E−05 | 1.8322E−05 | −3.4686E−06 | 2.4360E−07 | −9.8796E−09 | 7.2375E−11 |
| S14 | 1.8109E−03 | −6.6115E−04 | 8.9112E−05 | −6.9228E−06 | 2.5363E−07 | −3.5084E−09 | −6.3954E−12 |

Figure 66:
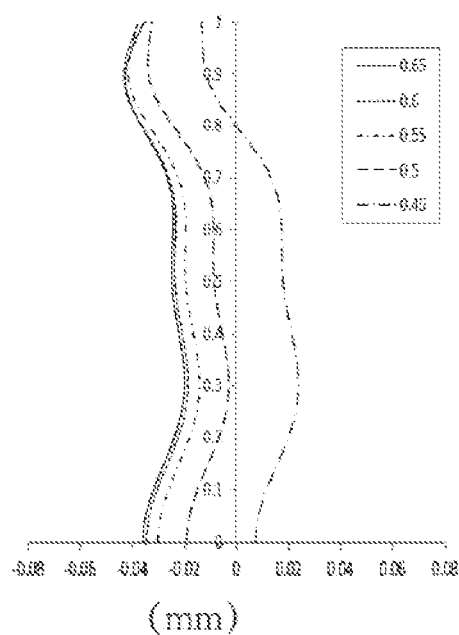
FIG. 66 is the axis chromatic aberration diagram of the seven-lens wide-angle camera lens of the seventeenth embodiment.
Figure 67:
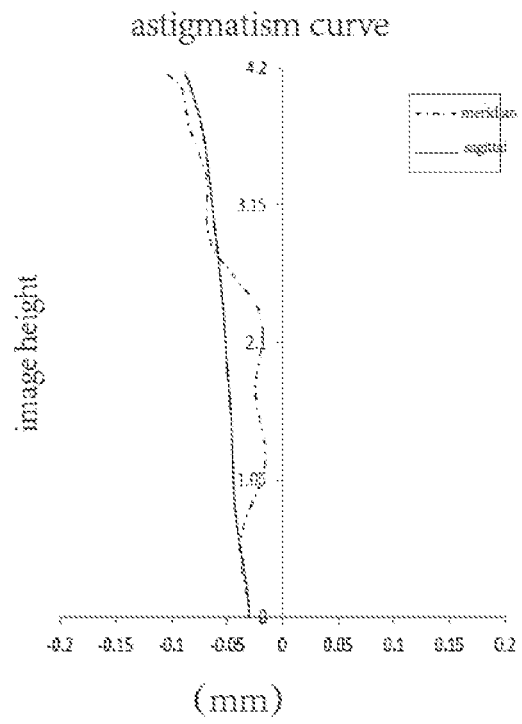
FIG. 67 is the astigmatism diagram of the seven-lens wide-angle camera lens of the seventeenth embodiment.
Figure 68:
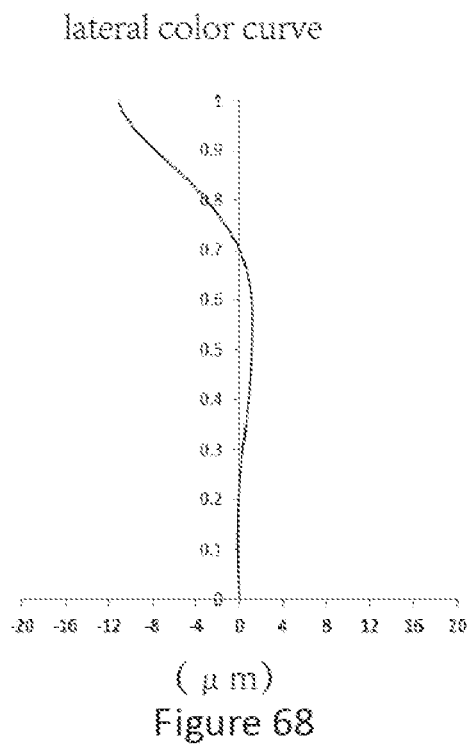
FIG. 68 is the ratio chromatism diagram of the seven-lens wide-angle camera lens of the seventeenth embodiment.

The seven-lens wide-angle camera lens of the present embodiment, on the basis that 110° ultra wide angle is realized, satisfactorily rectifies the off axis aberration, the brightness the edge image surface and the distortion, as shown by FIGS. 66, 67 and 68, and maintains good manufacturability while realizing miniaturization. The above embodiments are merely preferable particular embodiments that are presented to fully illustrate the wide-angle shooting camera lens of the present invention, and are not limiting the protection scope of the present invention. The equivalent substitutions or alternations that are made by a person skilled in the art on the basis of the present invention all fall within the protection scope of the present invention. The protection scope of the present invention is limited by the contents that are set forth by the claims.

What is claimed is:

1. A seven-lens wide-angle camera lens, wherein: the seven-lens wide-angle camera lens comprises, successively from an object side of the seven-lens wide-angle camera lens to an image side of the seven-lens wide-angle camera lens:
    a first optical lens that has a negative refractive power;
    a second optical lens that has a negative refractive power;
    a third optical lens that has a refractive power;
    a fourth optical lens that has a positive refractive power;
    a fifth optical lens that has a negative refractive power;
    a sixth optical lens that has a positive refractive power, wherein an image side surface of the six optical lens is a convex surface; and
    a seventh optical lens that has a negative refractive power;
    wherein:

$0.06 < CT3/TTL < 0.15;$ $-0.7 < f6/f7 < -0.2;$ and $-4.1 < f1/f < -2.5;$ where, CT3 is a center thickness of the third optical lens that is on an optical axis; TTL is an axial distance from the object side surface of the first optical lens to an imaging plane of the seven-lens wide-angle camera lens, f6 is an effective focal length of the sixth optical lens, f7 is an effective focal length of the seventh optical lens, f1 is an effective focal length of the first optical lens, and f is an effective focal length of the seven-lens wide-angle camera lens; and
    wherein, the seven-lens wide-angle camera lens has a total of seven optical lenses.

2. The seven-lens wide-angle camera lens according to claim 1, wherein:

$1.5 < f4/f < 3;$ where, f4 is an effective focal length of the fourth optical lens; and f is an effective focal length of the seven-lens wide-angle camera lens.

3. The seven-lens wide-angle camera lens according to claim 1, wherein:

$1.3 < ImgH/f < 2.5;$ where, ImgH is a half diameter of an effective pixel region at an imaging plane of the seven-lens wide-angle camera lens; and f is an effective focal length of the seven-lens wide-angle camera lens.

4. The seven-lens wide-angle camera lens according to claim 1, wherein:

$0.2 < \Sigma T/\Sigma TTL < 0.5;$ where, ΣT is a sum of axial spacing distances of all two adjacent optical lenses from the first optical lens to the seventh optical lens; and TTL is the axial distance from the object side surface of the first optical lens to the imaging plane of the seven-lens wide-angle camera lens.

5. The seven-lens wide-angle camera lens according to claim 1, wherein:

$0.55 < CT3/CT6 < 1.3;$ where, CT3 is the center thickness of the third optical lens along the optical axis; and CT6 is a center thickness of the sixth optical lens along the optical axis.

6. The seven-lens wide-angle camera lens according to claim 1, wherein:

$0.25 < CT5/CT6 < 0.5;$ where, CT5 is a center thickness of the fifth optical lens along the optical axis; and CT6 is a center thickness of the sixth optical lens along the optical axis.

7. The seven-lens wide-angle camera lens according to claim 1, wherein:

$0.7 < DT31/DT62 < 1.1;$ wherein, DT31 is an effective radius of an object side surface of the third optical lens; and DT62 is an effective radius of an image side surface of the sixth optical lens.

* * * * *